US006879965B2

(12) United States Patent
Fung et al.

(10) Patent No.: US 6,879,965 B2
(45) Date of Patent: Apr. 12, 2005

(54) METHOD, SYSTEM AND COMPUTER READABLE MEDIUM FOR WEB SITE ACCOUNT AND E-COMMERCE MANAGEMENT FROM A CENTRAL LOCATION

(75) Inventors: Daniel Y. Fung, New York, NY (US); Brandon C. Hood, New York, NY (US)

(73) Assignee: Passgate Corporation, New York, NY (US)

( * ) Notice: Subject to any disclaimer, the term of this patent is extended or adjusted under 35 U.S.C. 154(b) by 381 days.

(21) Appl. No.: 09/879,964

(22) Filed: Jun. 14, 2001

(65) Prior Publication Data

US 2002/0055909 A1 May 9, 2002

Related U.S. Application Data

(62) Division of application No. 09/627,792, filed on Jul. 27, 2000, now abandoned.
(60) Provisional application No. 60/191,550, filed on Mar. 23, 2000, and provisional application No. 60/186,303, filed on Mar. 1, 2000.

(51) Int. Cl.[7] ............................. G06F 17/60; G06K 5/00
(52) U.S. Cl. ............................. 705/39; 705/44; 705/26; 235/380; 235/379
(58) Field of Search ............................. 705/39, 35, 41, 705/44, 26; 235/379, 380; 700/232

(56) References Cited

U.S. PATENT DOCUMENTS

| | | | |
|---|---|---|---|
| 5,060,263 A | 10/1991 | Bosen et al. | |
| 5,241,594 A | 8/1993 | Kung | |
| 5,326,960 A | 7/1994 | Tannenbaum | |

(Continued)

FOREIGN PATENT DOCUMENTS

| | | |
|---|---|---|
| CA | 2 364 297 | 8/2000 |
| EP | 0 717 339 | 6/1996 |
| EP | 0 717 339 A | 6/1996 |

(Continued)

OTHER PUBLICATIONS

Transale TM Introduces Cardlock TM, Sep. 12th 2000, PR Newswire, (Dialog accession No. 07801095).*

(Continued)

*Primary Examiner*—Michael J. Carone
*Assistant Examiner*—James S. Bergin
(74) *Attorney, Agent, or Firm*—Carlos R. Villamar; Nixon Peabody, LLP

(57) ABSTRACT

A method, system and computer readable medium for, from a central Web site, performing at least one of registering a user at a destination Web site, logging in a user at a destination Web site and managing an online financial transaction at a destination Web site, including parsing a form Web page of the destination Web site to extract form data fields therefrom; mapping form data fields of a central Web site form to corresponding extracted form data fields of the form Web page of the destination Web site; and using the mapped form data fields to perform at least one of registering a user at the destination Web site, logging in a user at the destination Web site and managing an online financial transaction of a user at the destination Web site. In another aspect, there is provided a method, system and computer readable medium for managing an online or offline financial transaction of a user, from a central Web site, including generating financial transaction account information for a user based on existing credit or debit card information; gathering from the user one or more limits that are applied to a financial transaction performed based on the financial transaction account information; receiving from a source information indicating that an online or offline financial transaction using the financial transaction account information is in progress; applying the one or more limits gathered from the user to approve or disapprove the online or offline or online financial transaction that is in progress; and transmitting an approval or disapproval signal to the source based on a result of the applying step.

28 Claims, 26 Drawing Sheets

U.S. PATENT DOCUMENTS

| | | | |
|---|---|---|---|
| 5,350,906 | A | 9/1994 | Brody et al. |
| 5,478,994 | A | 12/1995 | Rahman et al. |
| 5,590,197 | A | 12/1996 | Chen et al. |
| 5,606,614 | A | 2/1997 | Brady et al. |
| 5,627,355 | A | 5/1997 | Rahman et al. |
| 5,655,077 | A | 8/1997 | Jones et al. |
| 5,684,950 | A | 11/1997 | Dare et al. |
| 5,715,314 | A | 2/1998 | Payne et al. |
| 5,781,632 | A | 7/1998 | Odom |
| 5,790,785 | A | 8/1998 | Klug et al. |
| 5,794,259 | A | 8/1998 | Kikinis |
| 5,815,665 | A | 9/1998 | Teper et al. |
| 5,825,881 | A | 10/1998 | Colvin, Sr. |
| 5,850,446 | A | 12/1998 | Berger et al. |
| 5,864,830 | A | 1/1999 | Armetta et al. |
| 5,883,810 | A | 3/1999 | Franklin et al. |
| 5,905,862 | A | 5/1999 | Hoekstra |
| 5,982,891 | A | 11/1999 | Ginter et al. |
| 6,000,033 | A | 12/1999 | Kelley et al. |
| 6,000,832 | A | 12/1999 | Franklin et al. |
| 6,070,154 | A | 5/2000 | Tavor et al. |
| 6,072,870 | A | 6/2000 | Nguyen et al. |
| 6,073,113 | A | 6/2000 | Guinan |
| 6,227,447 | B1 | 5/2001 | Campisano |
| 6,341,724 | B2 | 1/2002 | Campisano |
| 6,422,462 | B1 * | 7/2002 | Cohen ................... 235/381 |
| 2001/0034720 | A1 * | 10/2001 | Armes ....................... 705/65 |
| 2003/0028481 | A1 * | 2/2003 | Flitcroft et al. .............. 705/39 |

FOREIGN PATENT DOCUMENTS

| | | |
|---|---|---|
| EP | 0 745 961 A2 | 12/1996 |
| EP | 1 089 516 | 4/2001 |
| EP | 1 089 516 A2 | 4/2001 |
| WO | WO 99/10850 | 3/1999 |
| WO | WO 99 14711 A | 3/1999 |
| WO | WO 99 49424 | 9/1999 |
| WO | WO 99/49424 A | 9/1999 |
| WO | WO 00/52900 | 9/2000 |
| WO | WO 00 52900 A | 9/2000 |

OTHER PUBLICATIONS

Transale Completes first round of Financing; Technorov and Leumi & Co to Fund the Company's Development Plans, Oct. 2$^{nd}$, 2000, PR Newswire, (Dialog accession No. 07861203).* http://www.virtualschool.edu/mon/ElectronicProperty/klamond/credit_card.htm Keith Lamond, "Credit Card Transactions Real World and Online", printed on Apr. 29, 2000, 18 pages.

Lisa Guernsey, "Annoymous Shopping At Stores on the Web", The New York Times, Jun. 15, 2000, p. E3.

http://www.privatebuy.com, printed on Jun. 21, 2000, 1 page.

http://www.privatebuy.com/pb_press.htm, printed on Jun. 21, 2000, 3 pages.

http://www.cyberbuck.net/aboutusnew.asp?list=8, printed on Jul. 7, 2000, 1 page.

http://www.passlogix.com/home.asp, printed on Jul. 10, 2000, 1 page.

http://www.thecrystalcave.net/passwordclingon.html, printed on Jul. 10, 2000, 2 pages.

http://softseek.zdnet.com/Utilities/Encryption_Security_and_Passw...Review_7659_index.htm, printed on Jul. 10, 2001, 1 page.

www.celcosery.com/features.html, printed on Jul. 10, 2000, 3 pages.

http://download.cnet.com/downloads/0–10071–100–906341.html?tag=st.dl.10013_1–3_1.lst.td, printed on Jul. 10, 2000, 1 page.

http://download.cnet.com/downloads/0–10059–100–2181470.html?tag=st.dl.10013_103_1.lst.td, printed on Jul. 10, 2000, 1 page.

http://download.cnet.com/downloads/0–10071–100–889603.html?tag=st.dl.10013_103_1.lst.td, printed on Jul. 10, 2000, 1 page.

http://download.cnet.com/downloads/0–10071–100–875126.html?tag=st.dl.10071_106_9.lst.td, printed on Jul. 10, 2000, 1 page.

http://download.cnet.com/downloads/0–10059–100–1681000.html?tag=st.dl10013_103_1.lst.td, printed on Jul. 10, 2000, 1 page.

http://download.cnet.com/downloads/0–10059–100–1482127.html?tag=st.dl.10013_103_1.st.td, printed on Jul. 10, 2000, 1 page.

http://download.cnet.com/downloads/0–10071–100–912116.html?tag=st.dl.10013_1–3_1.lst.td, printed on Jul. 10, 2000, 1 page.

http://download.cnet.com/downloads/0–10059–100–875724.html?tag=st.dl.10013_103_1.lst.td, printed on Jul. 10, 2000, 1 page.

http://download.cnet.com/downloads/0–10071–100–890205.html?tag=st.dl.10013_103_1.lst.td, printed on Jul. 10, 2000, 1 page.

http://www.emmasoft.com/darn/whatispw.html, printed on Jul. 10, 2000, 1 page.

http://www.jotter.com/, printed on Jul. 13, 2000, 1 page.

http://www.gator.com/, printed on Jul. 13, 2000, 1 page.

http://www.obongo.com/chabi/webSite/Pressrel11.html, printed on Aug. 3, 2000, 3 pages.

Marcia Yablon, "Passing the Buxx to teens", U.S. News & World Report, Aug. 21, 2000, p. 67.

http://news.cnet.com/news/0–1007–200–2718520.html?tag=st.new.1002.srchres.ni, printed on Sep. 12, 2000, 4 pages.

http://www.digitalme.com/, printed on Sep. 27, 2000, 1 page.

http://www.digitalme/Learn_More/, printed on Sep. 27, 2000, 1 page.

http://login.passport.com/login.asp. Printed on Sep. 27, 2000, 1 page.

http://www.proxymate.com/, printed on Sep. 27, 2000, 1 page.

http://www.visabuxx.com/index.cfm?, printed on Oct. 4, 2000, 1 page.

Kids Shopping: A Future Proposition?, Digital Kids Report, Jul. 1995, n6.

Tracey Tucker, Chase, Nynex unveil prototype of Payment System for Interactive TV., American Banker, Sep. 26, 1995, p 17, v160, n185.

Transale Press Release, "Transale Pioneers a Revolution in Secure Online Payments," dated on its face to Jul. 9, 2000, on–line at http://www.transale.com/pressrelease.htm (accessed and printed Jun. 14, 2002).

* cited by examiner

FIG. 17

| Master Central Controller Credit Card Account Number (1702) | Subordinate Credit Card Account Number (1704) | Balance Modification Changes for Subordinate Card (1706) | Personal Data Changes for Subordinate Card (1708) | Central ControllerID (1710) | Modification Request Tracking Number (1712) |
|---|---|---|---|---|---|

FIG. 18

| Master User Credit Card Account Number (1802) | Subordinate User Credit Card Account Number (1804) | Desired/Confirmed Balance Data History for Subordinate Card (1806) | Personal Data History for Subordinate Card (1808) | Master Central Controller User Identifier Number (1810) | Subordinate Card Transaction Request/ Confirmation Data History (1812) |
|---|---|---|---|---|---|

| Subordinate Central Controller User Identifier Number (Online User) (1814) | Master User Restrictions On Subordinate Card (1816) | Subordinate Card Control History (1818) |
|---|---|---|

METHOD, SYSTEM AND COMPUTER READABLE MEDIUM FOR WEB SITE ACCOUNT AND E-COMMERCE MANAGEMENT FROM A CENTRAL LOCATION

CROSS REFERENCE TO RELATED CASES

The present invention is a division of and claims the benefit of the earlier filing date of co-pending U.S. patent application Ser. No. 09/627,792 filed Jul. 27, 2000, now abandoned, and claims priority under 35 U.S.C. § 119(e) to U.S. provisional patent applications 60/191,550 filed on Mar. 23, 2000 and 60/186,303 filed on Mar. 1, 2000, the entire contents of all of which are incorporated herein by reference.

BACKGROUND OF THE INVENTION

1. Field of the Invention

The present invention generally relates to the field of Web site account and e-commerce management and more particularly to a method, system and computer readable medium for managing a plurality of Web site accounts and for providing a secure methodology for e-commerce transactions from a central Web site location.

2. Discussion of the Background

In recent years, numerous Internet or World Wide Web ("WWW" or "Web") sites (e.g., Alta Vista, Yahoo!, autobytel.com, msn Hotmail, iwon, headhunter.net, Travelocity.com, deja.com, Amazon.com, etc.) have been created and require users to create personal accounts therein. The personal accounts typically include a login name and password and are typically linked to optional demographic, credit/debit card and other information, which can be entered through Web-based forms while the user is online.

However, due to the numerous personal online accounts and passwords which a single user typically generates to access the user's preferred Web sites, it is often difficult for the user to keep track of and manage the numerous accounts and passwords. Accordingly, typical inconveniences and/or issues attributed to such Web sites include, for example: (i) a user having to re-enter the same personal information at every new Web site at which the user wants to be registered, (ii) a user having to re-type the same recurring user names and passwords to get through the gateways of most Web sites and online e-mail accounts and (iii) a user being subjected to advertising systems which track the user's online destinations in order to deliver targeted advertisements to the user.

In addition, many of the Web sites allow for online purchasing of products and/or services via a credit/debit card. The ability to purchase such products and/or services online is based on existing credit/debit card information stored in a user's online account or based on credit/debit card information entered while online. However, typical concerns and inconveniences attributed to such Web sites include the financial security of a user's credit/debit card information while online on such Web sites and the privacy issues relating to online theft of such confidential information and other fraudulent acts. The wide-spread extent of such concerns is exemplified by an online survey conducted by Newsweek.MSNBC.com, which asked what cybercrime activity do most users fear. The results of the survey included a nasty computer virus (26%), a business meddler (6%), an e-mail spy (9%), a stranger approaching children in a chat room (11%) and a hacker stealing credit-card numbers (48%).

SUMMARY OF THE INVENTION

Accordingly, an object of this invention is to provide a method, system and computer readable medium for managing online user accounts including user names, passwords, demographic and/or credit/debit card information, via a central Web site location.

Another object of the invention is to provide an automated method, system and computer readable medium for managing online and offline credit/debit card transactions from a central Web site location.

Another object of the invention is to provide an automated method, system and computer readable medium for managing online and offline credit/debit card transactions from a central Web site location while minimizing the activation time of the credit/debit card.

Another object of the invention is to provide an automated method, system and computer readable medium for managing online and offline credit/debit card transactions from a central Web site location while minimizing the financial exposure of a user of the credit/debit card.

These and other objects are achieved according to the invention by providing an automated method, system and computer readable medium for managing user information at a central communications network site, including creating a unique user name and password for a user at the central communications network site; and using the unique user name and password to register the user at one or more other communications network sites.

In another aspect of the present invention, there is provided a method, system and computer readable medium for managing user online financial transactions at a central communications network site, including creating a unique online credit or debit card with a limited available balance based on an existing credit or debit card of a user; storing account and balance information for the unique online credit or debit card at the central communications network site; and allowing the user to execute a financial transaction using the unique online credit or debit card in place of the existing credit or debit card during an online financial transaction.

In another aspect of the present invention, there is provided a method, system and computer readable medium for managing user online financial transactions at a central communications network site, including creating a unique online credit or debit card for a user; and activating the unique online credit or debit card only during an online financial transaction.

In another aspect of the present invention, there is provided a method, system and computer readable medium for, from a central Web site, performing at least one of registering a user at a destination Web site, logging in a user at a destination Web site and managing an online financial transaction at a destination Web site, including parsing a form Web page of the destination Web site to extract form data fields therefrom; mapping form data fields of a central Web site form to corresponding extracted form data fields of the form Web page of the destination Web site; and using the mapped form data fields to perform at least one of registering a user at the destination Web site, logging in a user at the destination Web site and managing an online financial transaction of a user at the destination Web site.

In another aspect of the present invention, there is provided a method, system and computer readable medium for managing an online or offline financial transaction of a user, from a central Web site, including generating financial transaction account information for a user based on existing credit or debit card information; gathering from the user one or more limits that are applied to a financial transaction performed based on the financial transaction account information; receiving from a source information indicating that an online or offline financial transaction using the financial transaction account information is in progress; applying the one or more limits gathered from the user to approve or disapprove the online or offline or online financial transaction that is in progress; and transmitting an approval or disapproval signal to the source based on a result of the applying step.

In another aspect of the present invention there is provided a memory, at a central Web site, containing a data structure for storing information for managing an online or offline financial transaction, including at least one field for storing a financial transaction account number for financial transaction account information, which is based on existing credit or debit card information of a user, at least one field for storing a user identification number corresponding to a user of the existing credit or debit card information, at least one field for storing a user identification number for a user of the financial transaction account number and at least one field for storing one or more limits gathered from the user of the existing credit or debit card information that are applied to a financial transaction performed based on the financial transaction account information.

Accordingly, the present invention includes a computer readable medium storing program instructions by which processes of the present invention can be performed when stored program instructions are appropriately loaded into and executed by a computer and a system for implementing the processes of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 17 is a signal diagram for illustrating a signal format used in the system of FIG. 10, according to the present invention;

FIG. 18 is a data structure diagram for illustrating a data structure format used in the system of FIG. 10, according to the present invention;

DESCRIPTION OF THE PREFERRED EMBODIMENTS

Figure 1:
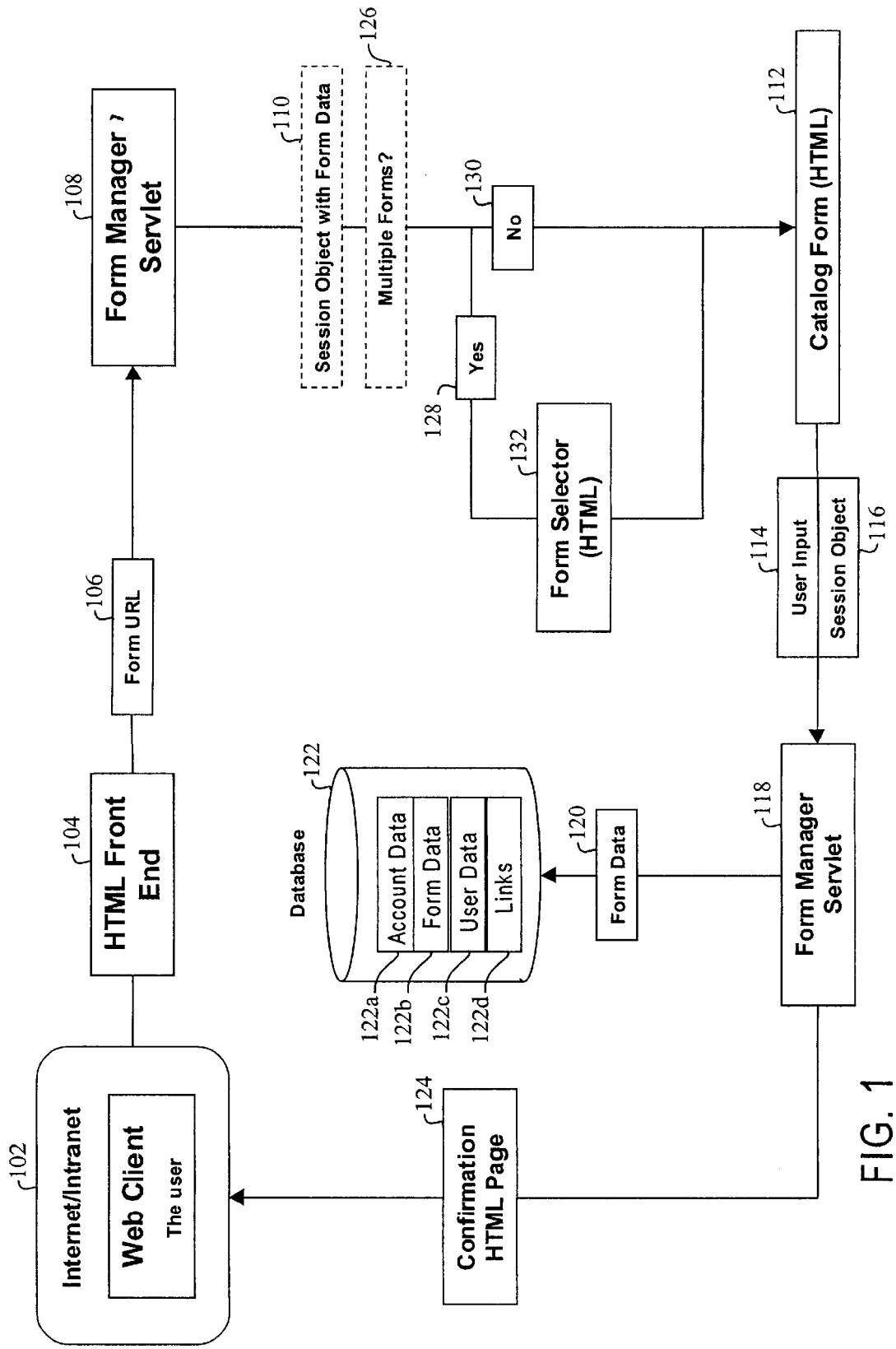
FIG. 1 is a system diagram for illustrating managing and collecting of form data received from a plurality of Web sites through a central Web site location, according to the present invention.

Referring now to the drawings, wherein like reference numerals designate identical or corresponding parts throughout the several views and more particularly to FIGS. 1–27 thereof, there are illustrated various embodiments of the present invention. A GLOSSARY is provided at the end of this section listing specialized terms and their definitions in the context of the present invention.

Central User Account Management

The central user account management according to the present invention is implemented via a central Web site location, wherein a user first becomes a member of the central Web site, for example, by: (1) filling out a membership or registration form and (2) picking a user name and password for the central Web site location. The central Web site suggests available user names should a requested user name prove to have been taken. The above steps may be performed at the central Web site location via a Web browser interface or via telephone, facsimile, e-mail, etc., as will be appreciated by those skilled in the relevant art(s). The registration form includes the fields for forms of popular and useful sites on the Internet, such as Alta Vista, Yahoo!, autobytel.com, msn Hotmail, iwon, headhunter.net, Travelocity.com, deja.com, Amazon.com, etc. This registration form advantageously becomes a user's "template" when the user wants to join other Web sites.

The registration information provided by a user is hosted at the central Web site location so that the central Web site can access the user's data and use the data to establish links to the user's preferred Web sites. The links at the central Web site location then become accessible to the user from any device, such as a computer, a cellular phone, a personal data assistant, etc., having an Internet connection. The central Web site then employs the user's information to automatically register the user at the user's preferred Web sites, saving the user the delay and inconvenience of repetitive typing and filling out of multiple forms for each preferred Web site. The user name and password provided at the central Web site location typically will be the last and only ones the user will ever have to remember to access the user's preferred Web sites in the future. In addition, a user of the central Web site can request additional sites to be added to the central Web site location at any time.

Once registered, a user is provided with a personal Web page by the central Web site and the user is able to login to the user's personal Web page, for example, to personalize the Web page or to add new Web sites. In one embodiment, a user can select, on the user's personal Web page, one or more Web sites that the user wishes to join and then click a button to have the central Web site register the user at the selected Web sites. In another embodiment, the user can click on a link to a Web site the user wishes to join provided in the user's personal Web page and the central Web site registers the user at such Web site.

The central Web site transmits the data from the user's registration form to the Web sites that the user chooses and dynamically generates links to those Web sites in the user's personal Web page. The central Web site automatically sends the user's login information to the selected Web sites and automatically connects the user to content held at the selected Web sites. In this way, a user is able to go directly to a "start page" of the user's selected Web site without having to enter any login information. In addition, the central Web site also allows a user to create links for sites at which the user is already registered. This is accomplished by allowing the user to input and store the existing user information for the registered Web sites at the central Web site location, by means of, for example, an online form including fields for storing the existing user information, via e-mail, via facsimile, via telephone, via wireless communications, etc. Encryption is used for all confidential user information, such as usernames, passwords, credit/debit card account numbers, demographic information, etc., stored at the central Web site location. The operation of the above-noted invention will now be described, with reference to FIGS. 1–3.

FIG. 1 is a system diagram for illustrating a registration form management system for managing and collecting registration form data for any of a plurality of Web sites, according to the present invention. The form data that is collected can then be used for automated registration of a user at any of a plurality of Web sites for which the form data has been obtained, as will be later discussed. The system may reside and operate on standard computer hardware, as is known in the computer art(s). The hardware runs software (e.g., Web server(s) software, etc.) that the system utilizes. The system is controlled with and designed through a Web interface (e.g., Web client 102). The server(s) that runs the form management system of FIG. 1 has access to the Internet, as the system uses networking code and communicates with Web sites in order to parse the respective forms of the Web sites. Also, because the server(s) has Internet access and is running as a Web server, users of the form management system do not have to be at the central Web site to use/manage the system. Secure logins (e.g., using strong 128-bit encryption, etc.) typically are required in order to access the system regardless of location of the user (i.e., on either an Intranet or on the Internet). Once the user of the form management system logs in at the Web client 102, the user submits a URL 106 via HTML front end 104 to a Form Manager Servlet (hereinafter referred to as "FMS") 108. The FMS 108 analyzes the requested Web page corresponding to the URL 106 and generates a session object including form data 110 and determines at 126 whether or not multiple forms are present from the session object 110. At 128, if it is determined that there are more than one form on the requested page, the FMS 108 presents to the user a form selector 132, for example, a Web page that shows/lists the available forms and allows the user to view the forms. The user (or the central Web site) then decides which one of the forms to catalog in catalog form 112, for example, implemented as a Web page and can go back and process other forms as well via the form selector 132. If it is determined that only one form is present from the session object 110, the form is cataloged in catalog form 112.

After the form(s) has been cataloged, the user is presented with an updated version of the catalog form 112, including a detailed breakdown and analysis of all of the form objects of the cataloged form(s). In catalog form 112 there is provided, for example, a drop-down menu next to each listed form object. The user uses this drop down menu to associate respective form fields from the Web page corresponding to the URL 106 with the central Web site's registration "template" fields (i.e., common field types are associated with personal information fields used by the central Web site).

For example, not all Web sites use the term "username" for the name of their login identification (e.g., Yahoo.com uses "yahooid" and some Web sites call the username an "ID name", "login name", "login ID", etc.). The central Web site's associations compensate for disparities in field names across different web sites by associating common field types. For example, sites with different field names for a common field type such as "login" are all associated with the same central Web site's registration "template" form field name (e.g., "username" ). After all of the fields have been given a central Web site association when applicable, the user submits these associations to an FMS 118, which may be the same FMS as FMS 108, via catalog form 112. Because the catalog form 112, where the associations are made, is an HTML form as well, that association data 114 is submitted to the FMS 118 and a session object 116 is automatically passed to the FMS 118. The FMS 118 takes the association data 114 and the data from the session object 116 (i.e., form tags/fields) and creates Structured Query Language (SQL) statements/form data 120 for each form object and which contain the form object data and an association thereof. These statements/form data 120 are sent to the database 122 and stored therein as form data 122b. The user via Web client 102 is then given a confirmation page 124 to indicate to the user that the cataloging was successful. The database 122 further stores user account data 122a, user data 122c and Web site link data 122d, as will be later described.

Figure 2:
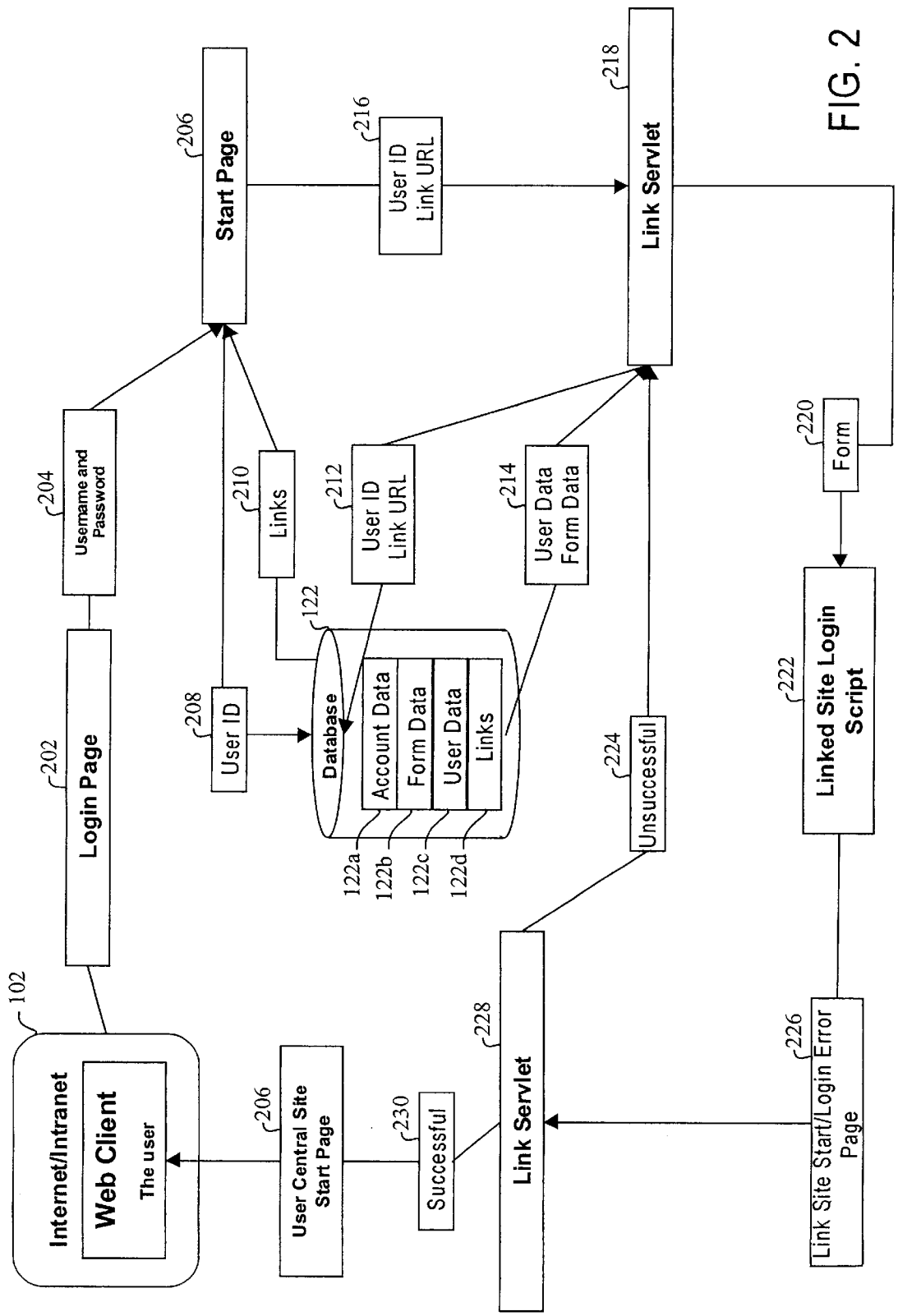
FIG. 2 is a system diagram for illustrating automated logging in of user information for a plurality of Web sites through a central Web site location, according to the present invention.

FIG. 2 is a system diagram for illustrating the automated logging in of user information in forms used by a plurality of Web sites through a central Web site location, according to the present invention. After the form data has been captured, cataloged and managed, as previously described with respect to FIG. 1, users are automatically logged into a chosen destination site, as will be described with respect to FIG. 2.

In FIG. 2, when a user of the central Web site wants to login to one of the user's linked Web sites, the user does so by entering the user's password and username 204 via login page 202 of Web client 102. A personalized start page 206, including the user's preferred Web site links is then generated. The start page 206 is generated from link data 210 corresponding to data 122d stored in the database 122 and associated with the user via user identification 208. The user identification 208 is derived from the user's password and username 204.

From the start page, the user can login to any of the Web sites corresponding to link data 210 and listed on the user's start page. Web sites are added and removed from a user's start page by means of a separate process (i.e., via user registration servlet (URS) 306 as will be described with respect to FIG. 3). Once the user decides which destination Web site the user wants to login to, the user clicks on a link, based on link data 210, represented as the destination Web site's name on the user's start page 206. The user's ID number and Web site choice 216 are then used, via link servlet 218 and data 212, to retrieve user data and form data 214 from the database 122. The user data and form data 214 correspond to data 122a, 122b and 122c stored in the database 122 and associated with the user's ID number.

The servlet 218 then dynamically creates and "fills-out" a completed login form 220 based on the user data and form data 214, by merging the user's account data 122a (i.e., username and password for the destination Web site) into the form 220. For example, if the Web destination site's login page has a textfield for the user's username and password, those fields are populated with the user's username and password data retrieved from the query. As previously described, when the form management system of FIG. 1 catalogs forms, form objects (e.g., textfields, password fields, etc.) are cataloged with corresponding field data from the central Web site's template of associated field names. User data, such as a person's telephone number, is also cataloged with a corresponding central Web site field data from the template.

In the above example, the servlet 218 "fills-out" the form 220 by simply inserting the requisite user data (e.g., associated as "username") into the corresponding form tag (e.g., also associated as "username") as the servlet 218 "writes" out the form 220. Once this virtual form 220 is completed, the servlet 218 submits the form 220 as a login script 222 to the destination Web site 218, just as if someone filled out the form 220 manually. The destination Web site then sends either a confirmation page or an error page 226 back to a central Web site servlet 228, which may be the same servlet as the servlet 218. The servlet 228 then parses the page 226 to determine whether or not the login operation was successful or unsuccessful. If the login operation is determined to be unsuccessful, as shown by element 224, the servlet 218 will attempt the login process a predetermined number of times (e.g., five times). If the login operation is determined to be successful, as shown by element 230, the servlet 228 presents the corresponding destination Web site start page 206 in a new web browser window or in the user's central Web site start page 206. The user is now logged in to the user's own account at the destination Web site. If the user visits an e-commerce Web site as the user's destination Web site, any online transactions will be protected, as will be described with respect to other embodiments of the present invention.

Figure 3:
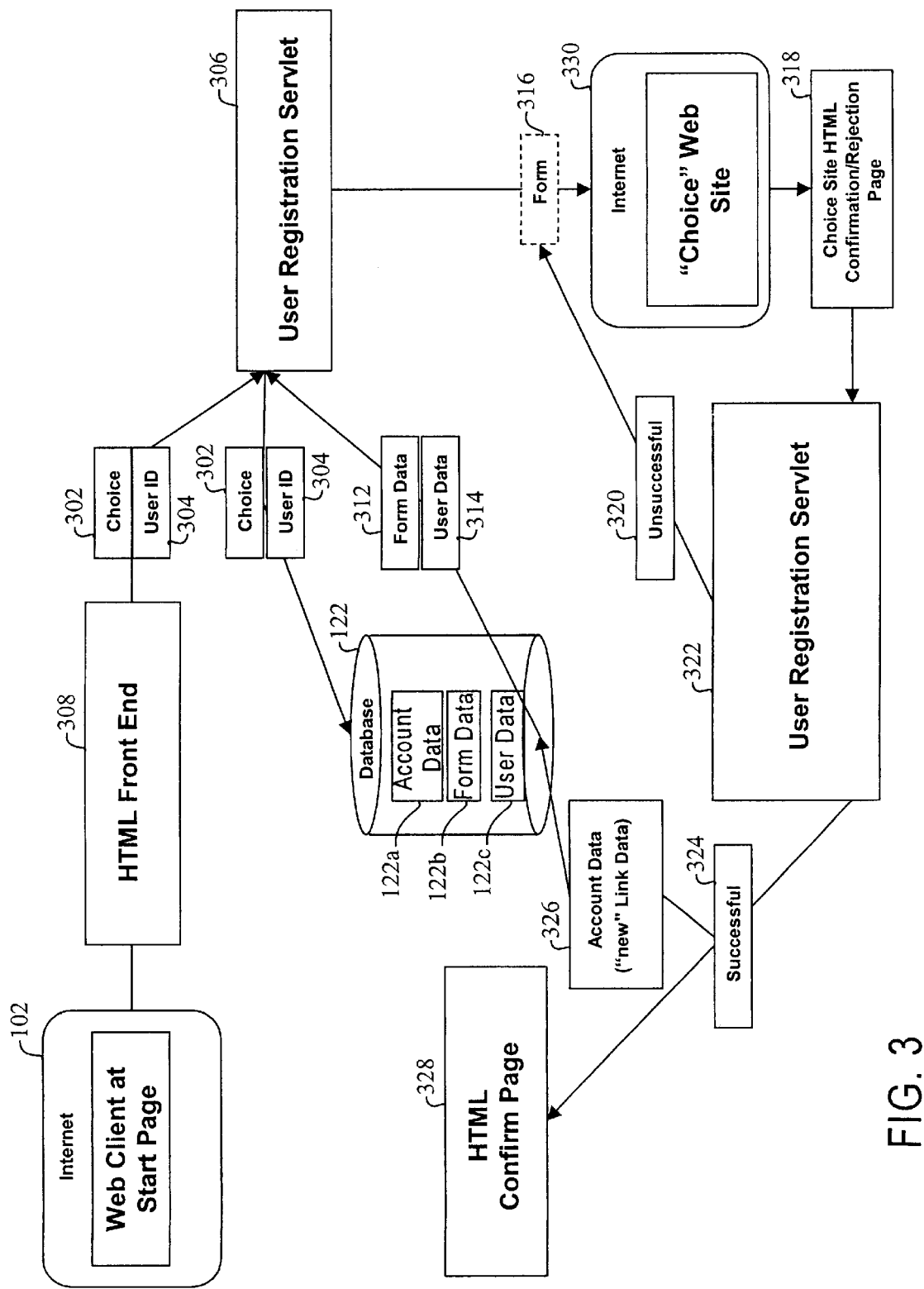
FIG. 3 is a system diagram for illustrating automated registering of user information at a plurality of Web sites through a central Web site location, according to the present invention.

FIG. 3 is a system diagram for illustrating automated registering of user information at a plurality of Web sites through a central Web site location, according to the present invention. As previously described with respect to FIGS. 1 and 2, according to the present invention a user is able to visit the user's favorite Web sites without having to manually enter respective user login information. FIG. 3 is used to describe how a user is automatically registered at any given Web site.

In FIG. 3, when a user of the central Web site wants to register with any one of many Web sites for which automated registration is offered, the user simply goes, via Web client 102, to a registration Web page at the central Web site. From the registration Web page the user can search a list of sites that have already been cataloged by the form management system, as described with respect to FIG. 1.

Once the user has decided at which Web site the user wants to be automatically registered, the user clicks on a link representing that site name. The user's ID number 304 and Web site registration choice 302 are then submitted via HTML front end 308 to a user registration servlet (hereinafter referred to as "URS") 306 for further processing. The URS 306 queries (e.g., using a SQL query) the database 122, using the user's ID number 304 and the Web site registration choice 302 as query criteria, to retrieve corresponding form data 312 and user data 314, stored as data 122b and 122c, from the database 122. As shown in FIG. 3, the database 122 includes account data 122a, Web site form data 122b and user data 122c.

The URS 306 then dynamically creates (i.e., "fills out") a completed form 316 by merging the user data 314 with form data 312 for a destination Web site 330 corresponding to the Web site registration choice 302. For example, if the destination Web site's 330 login page has a text field for a user's telephone number, that field is populated with the user's telephone number data retrieved from the user's account data 122a. When the central Web site catalogs forms, form objects (i.e., textfields, password fields, etc.) are cataloged with corresponding field data used by the central Web site from the central Web site's template of associated field names. User data, such as a person's telephone number, etc., is also cataloged with corresponding field data used by the central Web site from the central Web site's template.

In the above example, this allows the URS 306 to "fill-out" the form 316 by simply inserting the requisite user data (e.g., associated as "telephone") into the related form tag (e.g., also associated as "telephone") as the URS 306 "writes" out the form 316. Once this virtual form 316 is completed, the form 316 is submitted by the URS 306 to a corresponding form URL at the destination web site 330, just as if someone filled out the form manually. The destination Web site 330 then sends either a confirmation page or a rejection page 318 back to a URS 322, which may be the same as URS 306. The URS 322 then parses the page 318 to determine whether or not the registration operation was successful or unsuccessful. If the registration operation is unsuccessful, as shown by element 320, the URS 322 repeats the above described registration process a predetermined number of times (e.g., five times). If, however, the registration operation is successful, as shown by element 324, new account data 326 (i.e., the user's username and password at the destination Web site 330) is entered into the database 122. The user is then redirected to a confirmation page 328, which indicates to the user that the user is successfully registered at the destination Web site 330 and that the user's corresponding link at the central Web site is active.

In the above-described invention, the user name and password for the central Web site is different from each of those used to login/register the user into the destination Web sites. Accordingly, in the preferred embodiment CWS≠DWS1≠DWS2≠ ... DWSn, where CWS is the central Web site login name and password and DWS1, DWS2, ... DWSn are those for the destination Web sites. However, other embodiments are possible, for example, (i) CWS=DWS1=DWS2= ... DWSn and (ii) CWS≠DWS1=DWS2= ... DWSn, etc., as will be appreciated by those skilled in the relevant art(s). In addition, to maintain a user's online anonymity, the user names and/or passwords corresponding to CWS, DWS1, DWS2 and/or DWSn may be formed as a series of pseudo-random numbers and/or characters, as will be appreciated by those skilled in the relevant art(s). If the user chooses to use the user's own chosen personal user login name and password for the CWS, DWS1, DWS2 and/or DWSn, the central Web site issues a security warning to the user informing the user that the user's anonymity and/or online security may be comprised by using previously used and/or easily determined login names and/or passwords.

Online Credit/Debit Card Transaction Management with Minimized Activation Time

With respect to managing online credit/debit card transactions from a central Web site location, with minimized activation time, an online credit/debit card account is created, according to the present invention. The online credit/debit card account is made active only during online transaction processing, in order to mitigate the risks in preserving credit/debit card number security on the Internet.

The online credit/debit card account, according to one embodiment, works as follows. The central Web site provides to users a co-branded credit/debit card account (e.g., the Central Web site Visa Card), analogous to the ones provided by, for example, Citibank to American Airlines (i.e., the American Airlines Visa Card), Chase Manhattan Bank to the New York Knicks (i.e., the Knicks Card), etc. This online credit/debit card account functions exactly like a credit/debit card, only there is no actual "card" issued to the user (i.e., the online card is only available to a user while the user is online). This online credit/debit card account includes the above-describe "Web active" credit service feature and provides a user the power of having the same spending abilities and capabilities online that a credit/debit card provides, without having to sacrifice the security of the user's personal finances.

Accordingly, the central Web site issues co-branded online credit/debit "cards" to its users (e.g., through Visa, Mastercard, etc.), except, advantageously, no "real" cards are manufactured for the central Web site's users. The Web active credit feature enables the online credit/debit card account to be active (i.e., able to accept charges), only while the user is actually online using the central Web site's services. Every time a user of the central Web site clicks on a favorite link to a favorite e-commerce Web site (e.g., e-commerce Web sites, auction Web sites, etc.), as previously described with respect to FIG. 2, software at the central Web site location simultaneously transmits an "update file," via, for example, encrypted e-mail, secure facsimile, secure wireless communication, secure telephone communication, etc., to the central Web site's co-branded bank(s)/financial institution(s), as the central Web site logs the user into the corresponding favorite e-commerce Web site. This "update file" is used to "activate" the user's online credit/debit card account, but only while the user is visiting one or more favorite Web sites during e-commerce transactions.

The "update file" contains a text table listing the online credit/debit account numbers of the users who are currently at a site where they need their charge capabilities to be "active." The central Web site typically provides parsing software code to the financial institution co-branding the central Web site's online credit/debit card accounts, to parse the "update file" that the central Web site, for example, e-mails to the financial institution. The financial institution's own programmers may customize the output of the central Web site's parsing software to work with the financial institution's own architecture, to change the status of the central Web site's own online credit/debit card accounts from "accept" to "decline" and vice versa, according to tables in the "update file."

The central Web site's software also sends another "update file" to de-activate a central Web site user's online credit/debit card account charging capabilities in whatever time the user sets as the user's desired "time out" period (e.g., in the range of 15–30 minutes after the online credit/debit card is initially activated). This "time out" period represents the length of time the user has to shop, before the user's credit/debit card account becomes inactive. Should a user's time run out before the user is done checking out, all that the user has to do is simply re-click on the user's link for that respective site in the user's personal Web page at the central Web site. Then the user continues on with the user's check-out procedures. Payment to the visited e-commerce Web sites, advantageously, are completed using existing procedures to charge a credit/debit "card" account known in the art (e.g., Visa's, Mastercard's, etc., existing procedures). A user's central Web site online credit/debit card account number is cross-referenced with the user's template profile, as described with respect to FIGS. 1 and 2 and the profile is used to register the user at new sites that require a credit/debit card. The above-described system and method of managing of e-commerce transactions from a central Web site location, with minimized online credit/debit card account activation time, will now be described in detail, with reference to FIG. 4.

Figure 4:
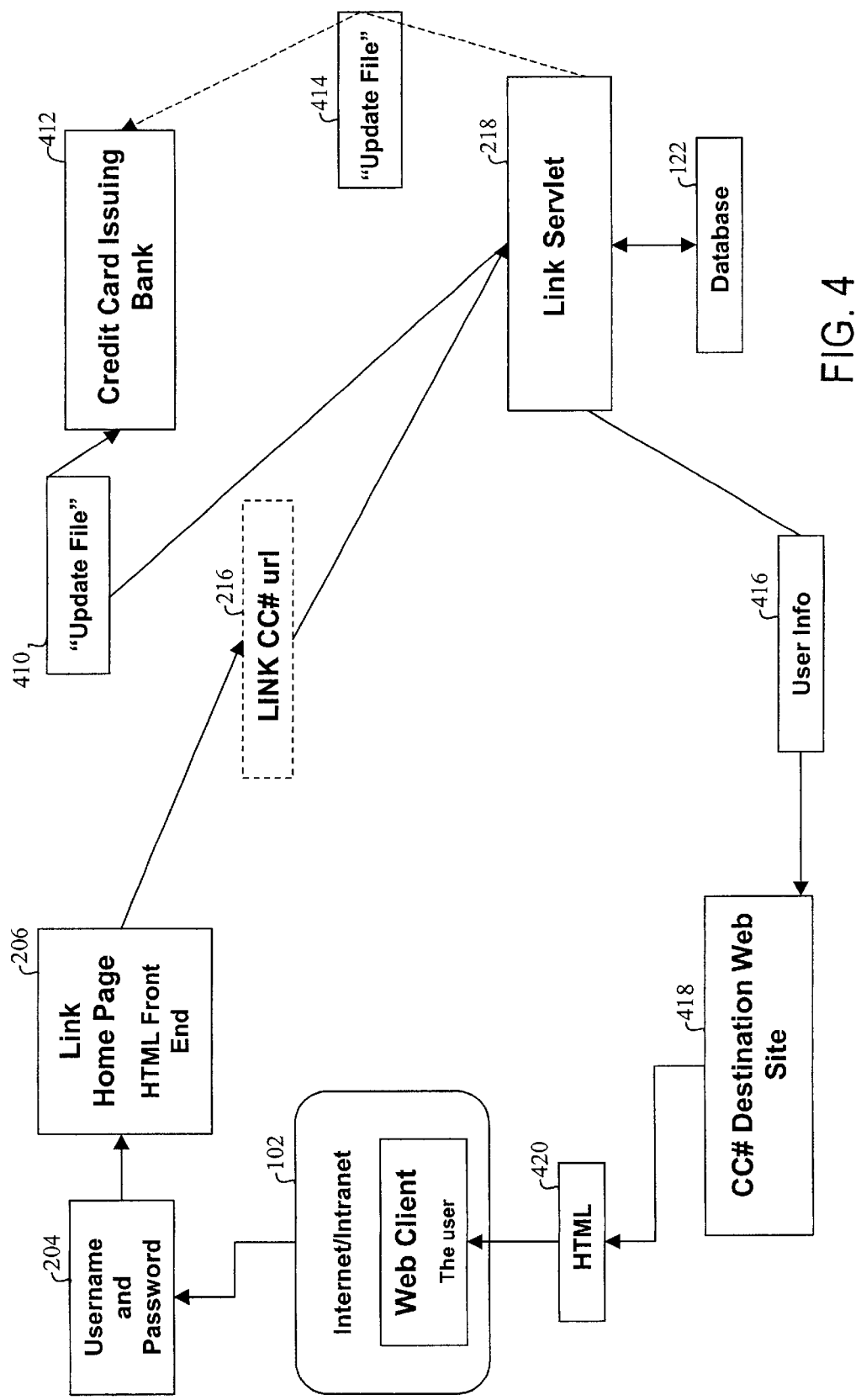
FIG. 4 is a general system diagram for illustrating managing of e-commerce transactions through a central Web site location, with minimized online credit/debit card account activation time, according to the present invention.

In FIG. 4, a user logs into the central Web site via Web client 102 and provides a user name and password 204 to the central Web site's HTML front end, which displays the user's corresponding personal Web page 206. The user clicks on a link to a destination e-commerce Web site 418 and the corresponding URL 216 is transmitted to a link servlet 218. The servlet 218 retrieves the corresponding form data for the URL 216 from database 122. The servlet 218 then submits the corresponding user information 416 to the chosen Web site 418. The servlet 218 transmits the user information 416, populated in the login script form data for URL 216 that is stored in the database 122, to the destination Web site 418. This, in effect, automatically enters, for the user, the user information 416 into the appropriate form(s) at the destination Web site 418. The output HTML 420 Web page from the destination Web site 418 is then transmitted to the user, via Web client 102.

The servlet 218 also transmits an update file 410 (e.g., via encrypted e-mail, secure facsimile, secure wireless communication, secure telephone communication, etc.) to a credit issuing financial institution 412 (e.g., a bank) to activate the user's online credit/debit card account. After a predetermined or user-specified time period (e.g., 15–30 minutes), another update file 414 is sent to the financial institution 412 (e.g., via encrypted e-mail, secure facsimile, secure wireless communication, secure telephone communication, etc.) to deactivate the user's online credit/debit card account. After the financial institution 412 receives the update files 410 or 414, the files are parsed to isolate data elements corresponding to account numbers, accept or decline instructions, etc. The financial institution 412 then cross references the parsed data with its own internal credit/debit card database of tables, completing the operation. The managing of e-commerce transactions from a central Web site location, with minimized online credit/debit card account activation time, will now be described in detail, with reference to FIG. 5.

Figure 5:
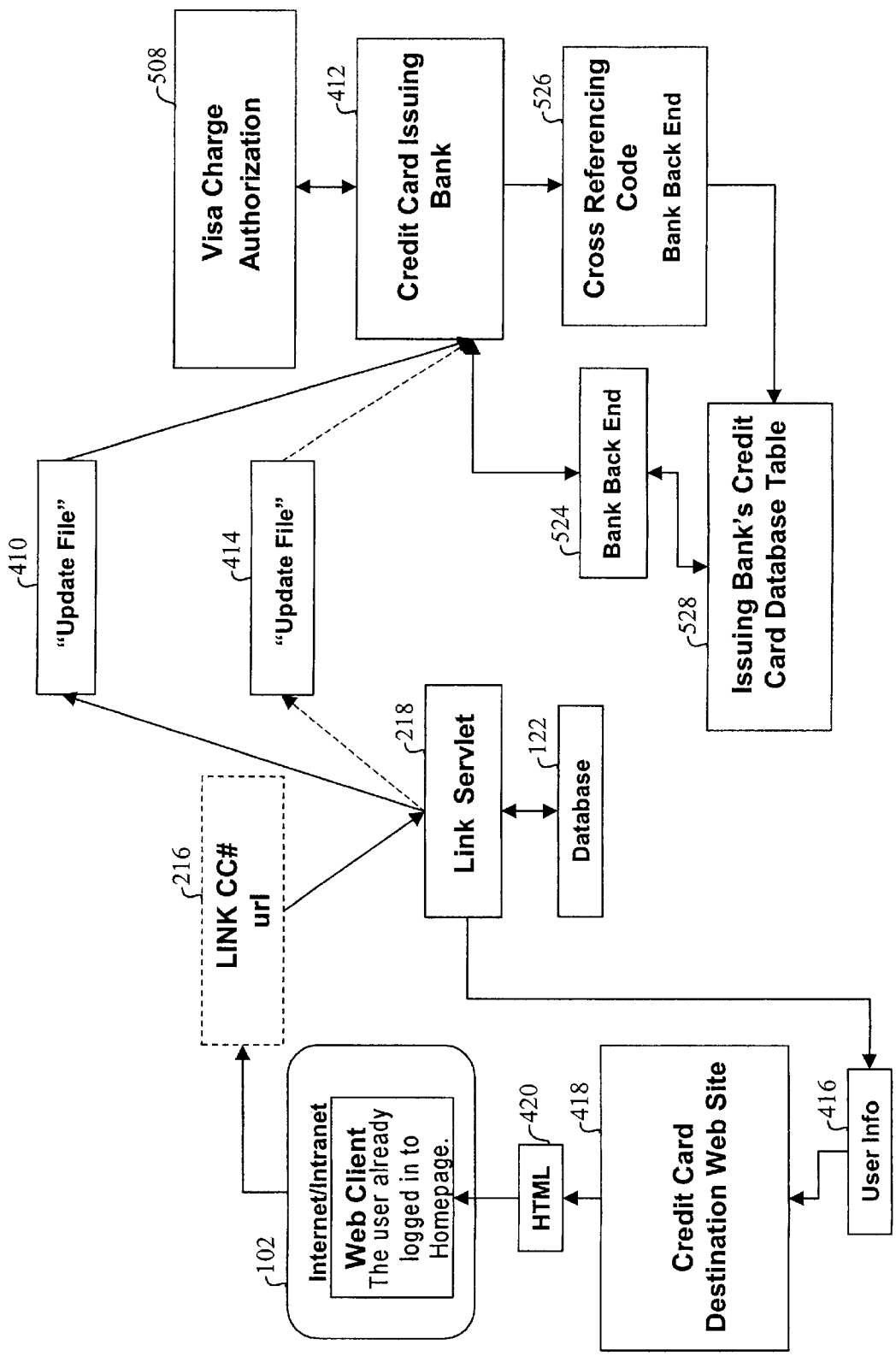
FIG. 5 is a detailed system diagram for illustrating managing of e-commerce transactions through a central Web site location, with minimized online credit/debit card account activation time, according to the present invention.

In FIG. 5, after a user is logged into the central Web site via Web client 102 and submits a URL 216 for a chosen e-commerce Web site 418 from the user's personal Web page, a servlet 218 retrieves the corresponding form data for the URL 216 from the database 122. The servlet 218 transmits the user information 416, populated in the login script form data for the URL 216 that is stored in the database 122, to the destination Web site 418. This, in effect, automatically enters, for the user, the user information 416 into the appropriate form(s) at the destination Web site 418. The HTML Web page 420 output from the destination Web site 218, based on the entered user information 416, is then transmitted to the user via Web client 102.

The servlet 218 also transmits an update file 410 (e.g., via encrypted e-mail, secure facsimile, secure wireless communication, secure telephone communication, etc.) to the credit issuing financial institution 412 (e.g., a bank) to activate the user's online credit/debit card account. After a predetermined or user-specified time period (e.g., 15–30 minutes), another update file 414 is sent to the financial institution 412 (e.g., via encrypted e-mail, secure facsimile, secure wireless communication, secure telephone communication, etc.) to deactivate the user's online credit/debit card account. After the financial institution 412 receives the update files 410 or 414, the files are parsed to isolate data elements corresponding to account numbers, accept or decline instructions, etc. A credit/debit card network 508 (e.g., Visa, Mastercard, etc.) then requests authorization from, for example, the financial institution 412, which sends the credit/debit card network 508 the transaction authorization confirmation when the charge has been successfully processed. Depending on which accounts the central Web site updates to active or de-active status, the authorization is processed according to known procedures. The update file 410 typically is always sent to the financial institution 412 before the charge authorization request is received by the credit/debit card network 508 from an online retailer (i.e., the destination Web site 418).

A financial institution 412 back end process 524 requests authorization for a dollar value of the user's purchase(s) and a financial institution 412 back end process 526 cross references critical data parsed from the update files 410 or 414 with the financial institution's database tables 528 containing the central Web site's online credit/debit card accounts. The back end process 526 takes the critical data values and changes the necessary column and row values in the financial institution's database table 528 to toggle the active status of the central Web site's online credit/debit card accounts from "active" to "inactive" and visa versa.

Figure 6:
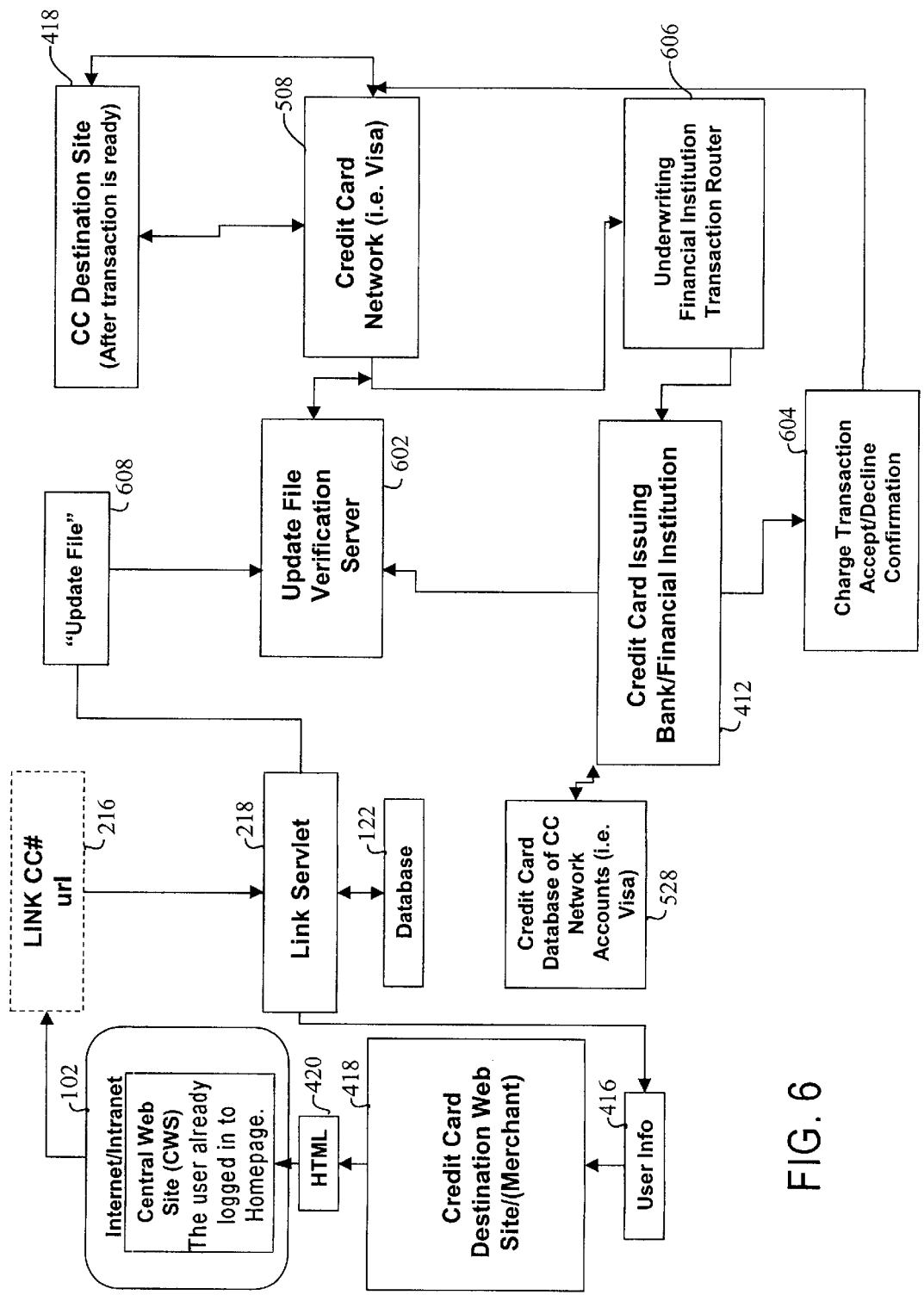
FIG. 6 is a detailed system diagram for illustrating managing of e-commerce transactions in a credit/debit card network through a central Web site location, with minimized online credit/debit card account activation time, according to another embodiment of the present invention.

FIG. 6 is a detailed system diagram for illustrating managing of e-commerce transactions in a credit/debit card network from a central Web site location, with minimized online credit/debit card account activation time, according to another embodiment of the present invention. In FIG. 6, after a user is logged into the central Web site via Web client 102 and submits a URL 216 for a chosen e-commerce Web site 418 from the user's personal Web page, a link servlet 218 retrieves the corresponding form data for the URL 216 from the database 122. The servlet 218 transmits the user information 416, populated in the login script form data for URL 216 that is stored in the database 122, to the destination Web site 418. This, in effect, automatically enters, for the user, the user information 416 into the appropriate form(s) at the destination Web site 418. The HTML Web page 420 output from the destination Web site 418, based on the entered user information 416, is then transmitted to the user via Web client 102. When the user at the destination Web site 418 makes an online credit/debit card transaction, this request is sent to a credit/debit card network 508 (e.g., Visa, Mastercard, etc.) and the servlet 218 transmits an update file 608 (e.g., via encrypted e-mail, secure facsimile, secure wireless communication, secure telephone communication, etc.) into a communications channel of the credit/debit card network 508. An update file verification server (hereinafter referred to as "UFVS") 602 monitors the communication channel (e.g., using Java script "sniffer/snooper" software) to filter out purchase requests made via the central Web site from normal traffic of traditional credit/debit card transactions in the communications channel of the credit/debit card network 508. The UFVS 602 verifies the central Web site's accounts against the update file 608 sent from the central Web site via the servlet 218. If the UFVS 602 determines that the update file 608 is not present, then the transaction is automatically rejected and the user is notified accordingly, (e.g., via message sent to the user's personal page at the central Web site, via e-mail, etc.).

If, however, the UFVS 602 determines that the update file 608 is present, the transaction is allowed to be processed. Accordingly, the credit/debit card network 508 takes user information transmitted via the update file 608 and authenticates that the user is online via the central Web site's UFVS 602. The credit/debit card network 508 then transmits a charge request to an underwriting financial institution (e.g., a bank) using known processes in place for credit/debit card transactions. Only after the user's transaction has been verified via the update file 608, the corresponding purchase request is sent back to an underwriting financial institution transaction router 606 to be merged into a same work flow as traditional credit/debit card transactions are handled. Accordingly, a credit/debit card issuing financial institution 412 (e.g., a bank) takes the credit/debit card account number transmitted from the underwriting financial institution transaction router 606 and checks its database to determine if there is enough credit to honor the transaction request for the user. After the transaction is processed by the credit/debit card issuing financial institution 412, an accept/decline confirmation 604 is sent to the UFVS 602 to initiate deletion of the update file 608, to the credit/debit card network and to the destination Web site 418 (i.e., merchant), completing the operation.

Minimal development time is needed to launch the implementation of the online credit/debit card account, with minimized activation time, because the service can be set up by using existing architectures (e.g., Visa's existing architectures, Mastercard's existing architectures, financial institution's existing architectures, etc.). Since the central Web site's online credit/debit card accounts are actual credit/debit "card" accounts, e-commerce Web sites will readily accept these accounts as an alternative form of payment during e-commerce transactions.

Accordingly, by limiting the activation time for the online credit/debit card account, a user will be able to minimize the user's financial exposure during online credit/debit card transactions.

Online Credit/Debit Card Transaction Management with Minimized Financial Exposure The online credit/debit card account, with minimized financial exposure, works as follows. The online credit/debit card system operates in a manner similar to a metro card for a mass transit authority (e.g., a MetroCard for the NYC Mass Transit Authority), but is "charged up" from a user's existing credit/debit card account with a bank or other financial institution. The online credit/debit card account system can be supported in the current marketplace, for example, by banking or financial institutions which have advanced encryption and online banking services already in place and by the financial institutions that issue credit/debit cards. The above-noted minimized financial exposure feature provides an additional measure of control over how much of a user's finances will be exposed during online financial transactions and can be used alone or in combination with other embodiments of the present invention.

The financial institutions that are supporting the current credit/debit card system will create an online credit/debit card account number which will allow their own customers to authorize a predetermined amount of money to be allocated to their "new" online credit/debit card account on the online credit/debit system of the central Web site. The "charging up" of the online credit/debit card account is done with the existing encrypted online banking networks and sites of the financial institutions providing the support for the online credit/debit card account system. After the online credit/debit card account is created and charged, the financial institution issuing the account forwards the balance information and account number to the central Web site along with customer information. The managing of e-commerce transactions from a central Web site location, with minimized financial exposure for an online credit/debit card account, will now be described with reference to FIG. 7.

Figure 7:
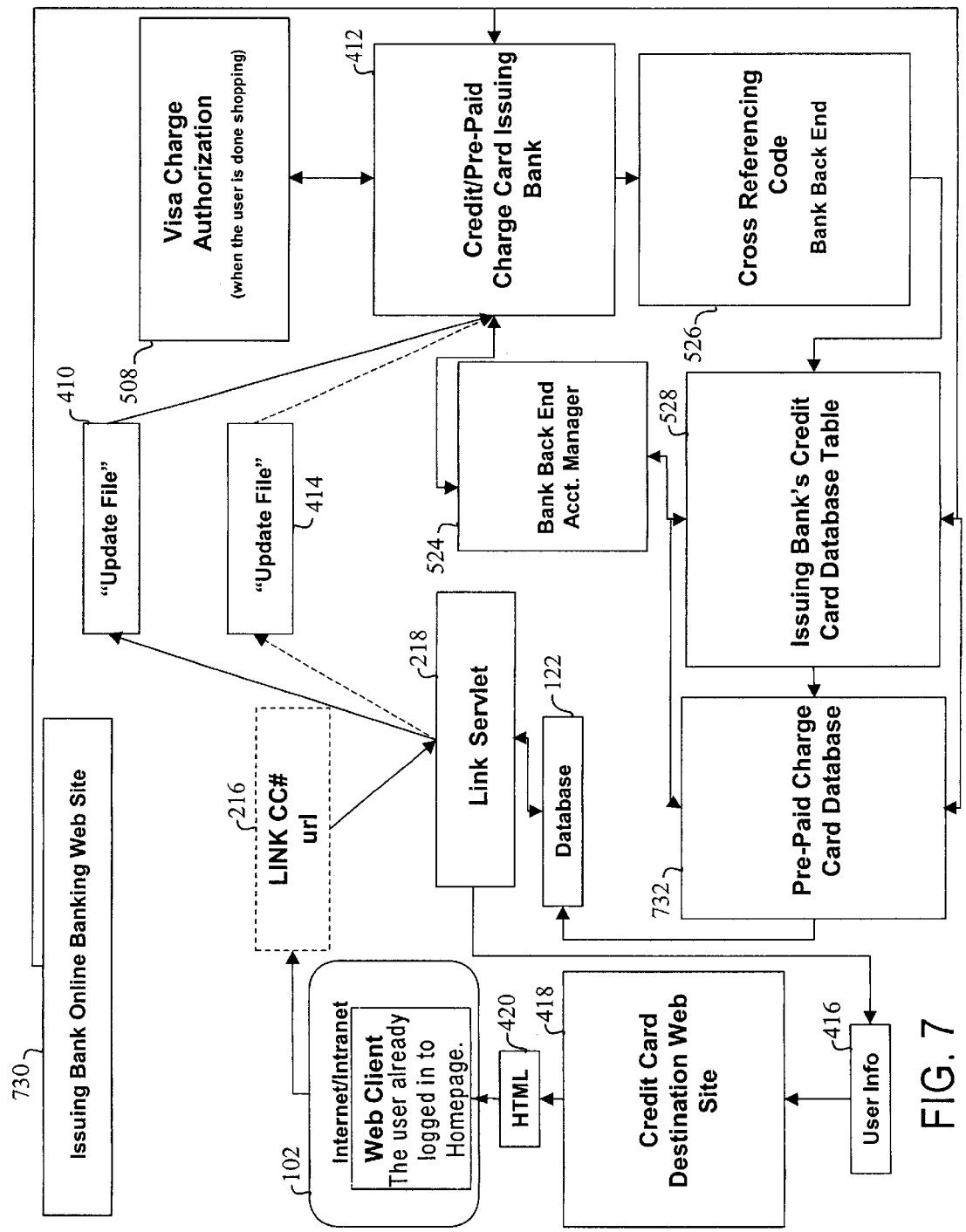
FIG. 7 is a detailed system diagram for illustrating managing of e-commerce transactions through a central Web site location, with minimized financial exposure of an online credit/debit card account, according to the present invention.

In FIG. 7, after a user is logged into the central Web site via Web client 102 and submits a URL 216 for a chosen e-commerce Web site 418 from the user's personal Web page, a servlet 218 retrieves them from the database 122 the corresponding form data for the URL 216. The servlet 218 transmits the user information 416, populated in the login script form data for URL 216 that is stored by the form management system of FIG. 1, to the destination Web site 418. This, in effect, automatically enters the user information 416 into the appropriate form(s) at the destination Web site 418, for the user. The HTML Web page 420 output from the destination Web site 418, based on the entered user information 416, is then transmitted to the user via Web client 102.

The servlet 218 also transmits an update file 410 (e.g., via encrypted e-mail, secure facsimile, secure wireless communication, secure telephone communication, etc.) to the credit issuing financial institution 412 (e.g., a bank) to activate the user's online credit/debit card account. After a predetermined or user-specified time period (e.g., 15–30 minutes), another update file 414 is sent to the financial institution 412 (e.g., via encrypted e-mail, secure facsimile, secure wireless communication, secure telephone communication, etc.) to deactivate the user's online credit/debit card account. After the financial institution 412 receives the update files 410 or 414, the files are parsed to isolate data elements corresponding to account numbers, accept or decline instructions, etc. A credit/debit card network 508 (e.g., Visa, Mastercard, etc.) then requests authorization from, for example, the financial institution 412, which sends the credit/debit card network 508 the transaction authorization confirmation when the charge has been successfully processed. Depending on which accounts the central Web site updates to active or de-active status, the authorization is processed according to known procedures. The update file 410 typically is always sent to the financial institution 412 before the charge authorization request is received by the credit/debit card network 508 from an online retailer (i.e., the destination Web site 418).

A financial institution 412 back end process 524 requests authorization for a dollar value of the user's purchase(s) and a financial institution 412 back end process 526 cross references critical data parsed from the update files 410 or 414 with the financial institution's database tables 528 containing the central Web site's online credit/debit card accounts. The back end process 526 takes the critical data values and changes the necessary column and row values in the financial institution's database table 528 to toggle the active status of the central Web site's online credit/debit card accounts from "active" to "inactive" and visa versa.

To limit the financial exposure of the online credit/debit card account, the user via, for example, the financial institution's 412 Web site 730 or other existing means, authorizes the "charging up" (i.e., pre-payment) of the online credit/debit card account. A pre-paid charge online credit/debit card account database 732 stores the user's pre-paid amount authorized from the user's existing credit/debit card account. The pre-paid charge online credit/debit card account database 732 is coupled to the central Web site's database 122 so that the user's online credit/debit card account balance and other information can be stored in the central Web site's database 122.

Minimal development time is needed to launch the implementation of the online credit/debit card account, with a minimized balance, because the service can be set up by using existing architecture (e.g., Visa's existing architectures, Mastercard's existing architectures, financial institution's existing architectures, etc.) and with the addition of an online credit/debit card pre-paid charge database 732. The online credit/debit card account system can therefore be used with existing and developing Web sites as an alternative to conventional credit/debit card numbers in their existing registration forms.

Accordingly, by limiting the amount of funds available to the online credit/debit card account, a user will be able to minimize the user's financial exposure during online credit/debit card transactions.

Secure Offline Credit/Debit Card Transaction Management

Although the present invention is described in terms of providing an online credit/debit card in the form of a virtual credit/debit card and typically will not entail issuing a real-world, physical card, in order to address security concerns, the present invention may be practiced by issuing a real-world physical credit/debit card, as will now be discussed.

Figure 8:
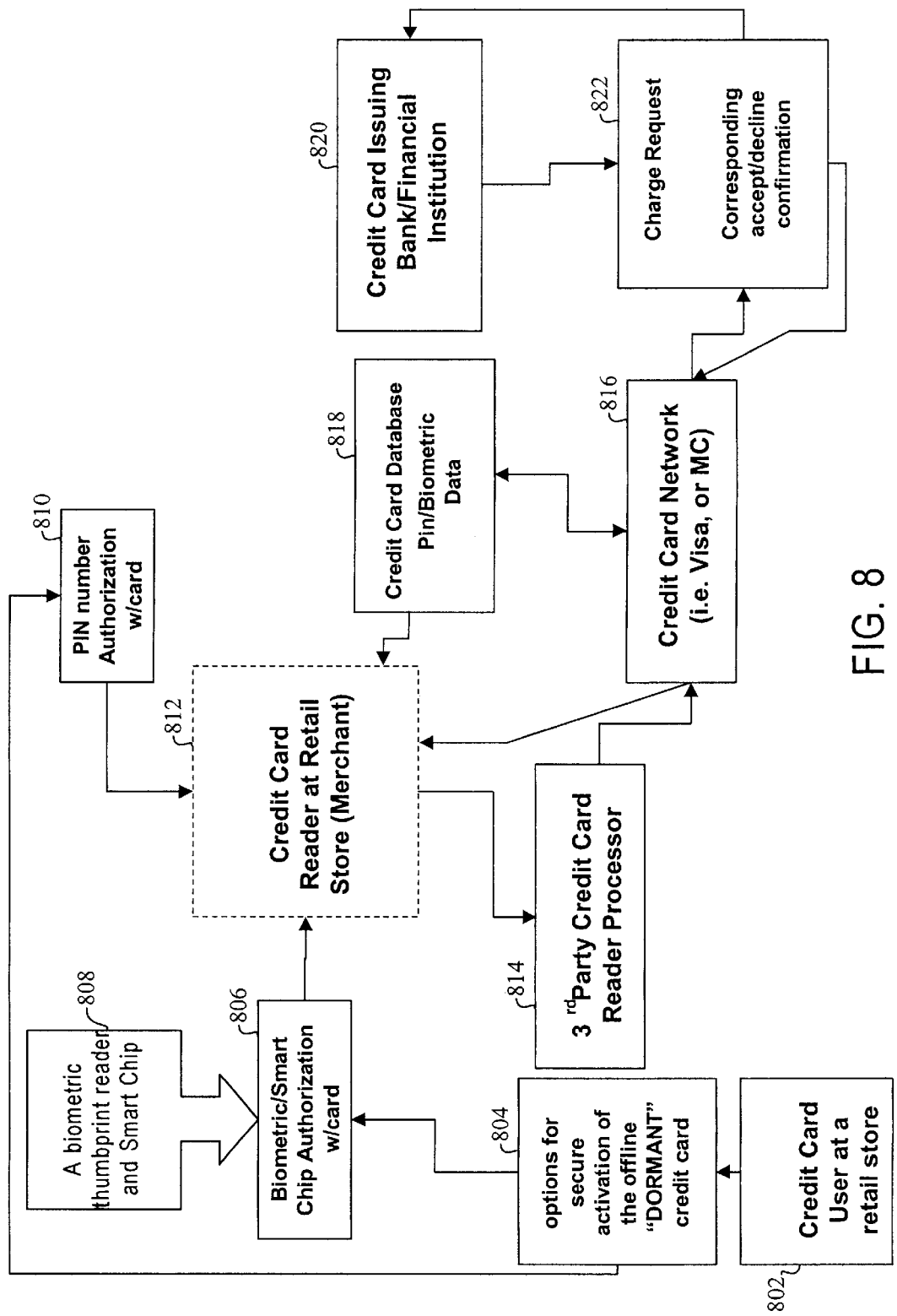
FIG. 8 is a detailed system diagram for illustrating managing of offline credit/debit card transactions, with minimized financial exposure of a credit/debit card account, according to the present invention.

FIG. 8 is a detailed system diagram for illustrating managing of offline credit/debit card transactions, with minimized financial exposure of a credit/debit card account, according to the present invention. In FIG. 8, a credit/debit card user 802 at a point-of-sale (POS) terminal of retail store attempts to make an offline credit/debit card purchase. The credit/debit card is configured to be dormant (i.e., not usable) until the user's identity is confirmed during a credit/debit card transaction in various possible ways, as shown by element 804. The user's identity may be confirmed via a biometric/smart chip extraction device 806 (e.g., a biometric thumb print/voice print, etc., extraction device 808) embedded within the credit/debit card, via PIN number extraction 810, via voice/retinal feature extraction, etc.

In any case, the user's identity information is extracted, this information is sent to a credit/debit card processor 814 (e.g., located in the retail store), which takes the user identification information and the credit/debit card transaction information and determines which credit/debit card network should receive the credit/debit card charge request. The credit/debit card processor 814 then submits the charge request to an appropriate credit/debit card network 816 (e.g., Visa, Mastercard, etc.). The credit/debit card network 816 then takes the information transmitted via the credit/debit card reader 812 and authenticates the identification data of the user gathered by whichever method was used (i.e., using the biometric, PIN number data, etc., of the user).

The credit/debit card network 816 uses a credit/debit card database 818 to authenticate the user's identity information. If authentication of the user can not be made via the database 818, then the credit/debit card remains in a dormant (i.e., unusable) state, a charge request is not forwarded to a credit/debit card issuing financial institution 820 (e.g., a bank) and a credit/debit card charge rejection is sent to the credit/debit card reader 812. If, however, authentication of the user can be made via the database 818, then the credit/debit card network 816 submits the charge request 822 to the credit/debit card issuing financial institution 820 using the same processes that have been established by the credit/debit card network 816 for normal credit/debit card transaction processing.

Accordingly, the credit/debit card issuing financial institution 820 takes the credit/debit card account number from the charge request 822 and verifies via its database 818 if there is enough credit to honor the transaction request for the user. After the transaction is processed by the credit/debit card issuing financial institution 820, an accept/decline confirmation 822 is sent to the credit/debit card network 816 and to the retailer, via the card reader 812, completing the credit/debit card transaction.

Figure 9:
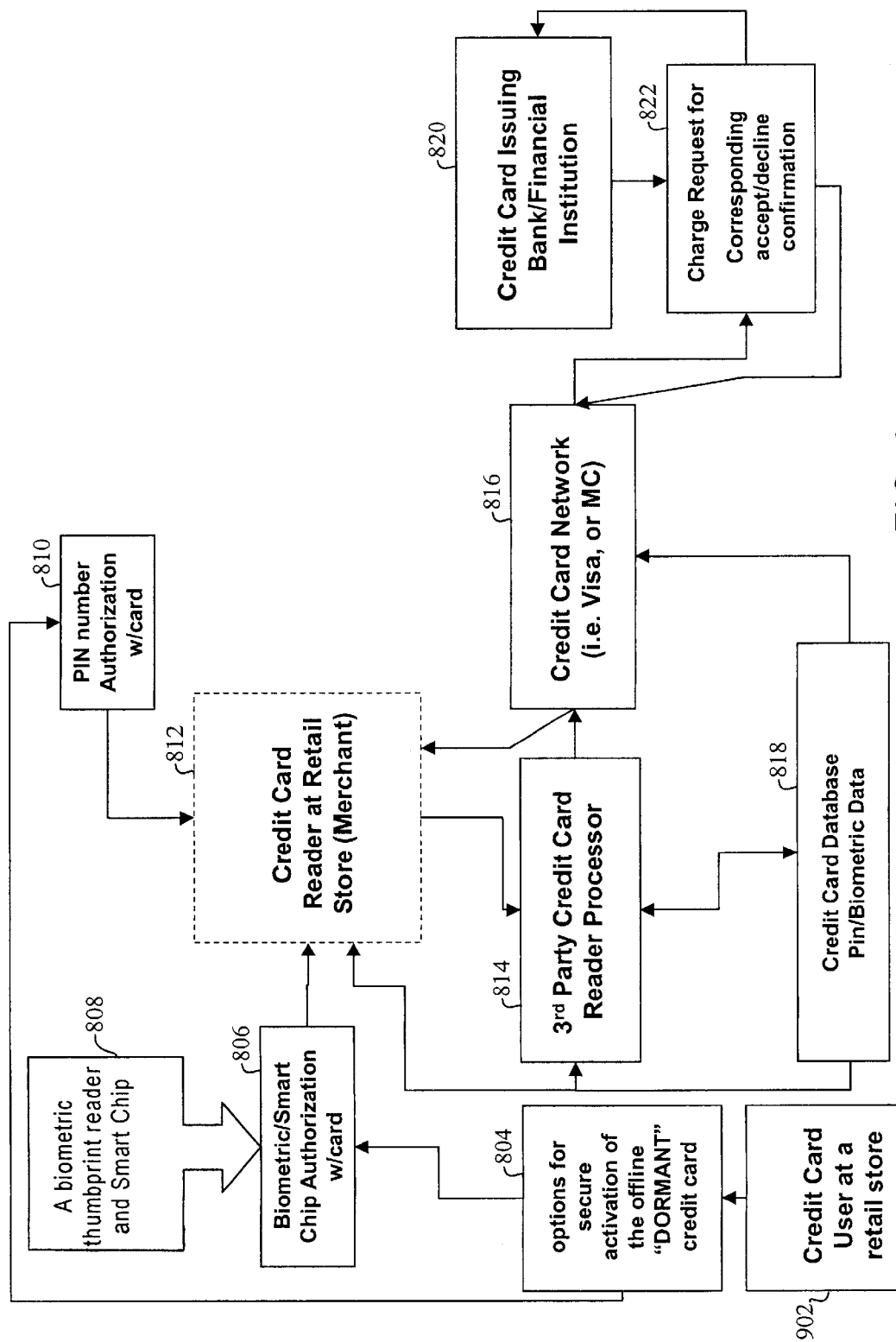
FIG. 9 is a detailed system diagram for illustrating managing of offline credit/debit card transactions, with minimized financial exposure of a credit/debit card account, according to another embodiment of the present invention.

FIG. 9 is a detailed system diagram for illustrating managing of offline credit/debit card transactions with minimized financial exposure of a credit/debit card account, according to another embodiment of the present invention. The system of FIG. 9, is similar to the system of FIG. 8, except that the credit/debit card database 818 for authenticating the user's identity information is not directly controlled by the credit/debit card network 816. Otherwise, the system of FIG. 9 operates in a similar manner as the system of FIG. 8 and will not be further described for the sake of brevity Accordingly, by controlling the offline credit/debit card account, a user will be able to minimize the user's financial exposure during offline credit/debit card transactions.

Subordinate Credit/Debit Card Control System

The present invention further includes what is referred to as a "Subordinate Card Control System," as later will be described in detail with reference to FIGS. 10–24. This so-called Subordinate Card Control System (SCCS) operates to facilitate both offline and online credit/debit card transactions and may be used in conjunction with any of the previously described embodiments of the present invention.

The SCCS inter-operates with existing architectures of banks/financial institutions. The administration/control function is performed via the central Web site for both offline and online transactions. Both the online and offline systems allow a primary credit/debit card holder, such as a parent, to issue a "subordinate" credit/debit card for a user, such as the holder's child, dependent, etc., which will have a pre-determined credit limit that can be changed at any time so long as the primary or "master" credit/debit card has an available balance. The pre-determined credit limit for the subordinate credit/debit card is set by the holder and is tied to the master card. Such a system can be used as a tool for parents to teach their children how to manage and spend money, while still being tethered to the parents' card for the parents' own comfort level of control. That is, the system provides a sort of transitory spending product for a child, until the child is ready to have his/her own credit/debit card. For example, the system allows a parent to issue his/her child a subordinate card when the child goes away to college, giving the child the responsibility related to the credit/debit card experience, as compared to conventional credit/debit card models.

In the simplest level of operation, the system will not only allow a parent to set a credit limit for the subordinate credit/debit card (i.e., the dependent's card), the system will also provide levels of control over the subordinate credit/debit card the for the parent. For example, (i) a calendar control feature is provided, which allows the parent the ability to only allow purchases using the subordinate credit/debit card during certain times of the month, (ii) a transaction limit feature is provided, which allows the parent the ability to limit a number of transactions with the subordinate credit/debit card within a pre-determined time period (e.g., during a week, during a month, during a day, etc.); and (iii) a merchant identification (ID) feature is provided, wherein subordinate credit/debit card transaction data packets contain a merchant ID number to reference the merchant selling goods/services purchased during the transaction. The central Web site maintains a table of merchant ID numbers and associated transaction data. The merchant ID numbers are further used to identify, for example, the merchant's industry, location, etc., allowing a parent to monitor a child's purchases using the subordinate credit/debit card with respect to industries, such a food services, supermarkets, transportation, etc. and with respect to location. Such ID numbers maintained in the central Web site's tables can be used by the parent to control and restrict transactions to only specific merchants (e.g., food services, transportation, etc.) and/or to restrict transactions for a whole genre of merchants (e.g., pornography, video games, music, etc.) via a control feature interface provided by the central Web site.

The central Web site provides the above-noted interface for the primary user (e.g., a parent) to set the above-noted controls. Then, when a subordinate credit/debit card transaction occurs, the central Web site only processes the transaction (i.e., forwards the subordinate credit/debit card transaction data packet to the central Web site's issuing bank/financial institution) if the transaction meets the control criteria, such as during a pre-determined time or at a predetermined location as set by the parent.

The above-described SCCS works seamlessly for both online and offline subordinate credit/debit card transactions, because the central Web site sees the transaction data packets for all transactions, both online and offline, before forwarding the packets on to the issuing bank/financial institution. Accordingly, the central Web site decides whether or not to forward the transaction data packet, based upon the controls set up by the parent via the central Web site interface. The SCCS will now be described, with reference to FIGS. 10–24.

Figure 10:
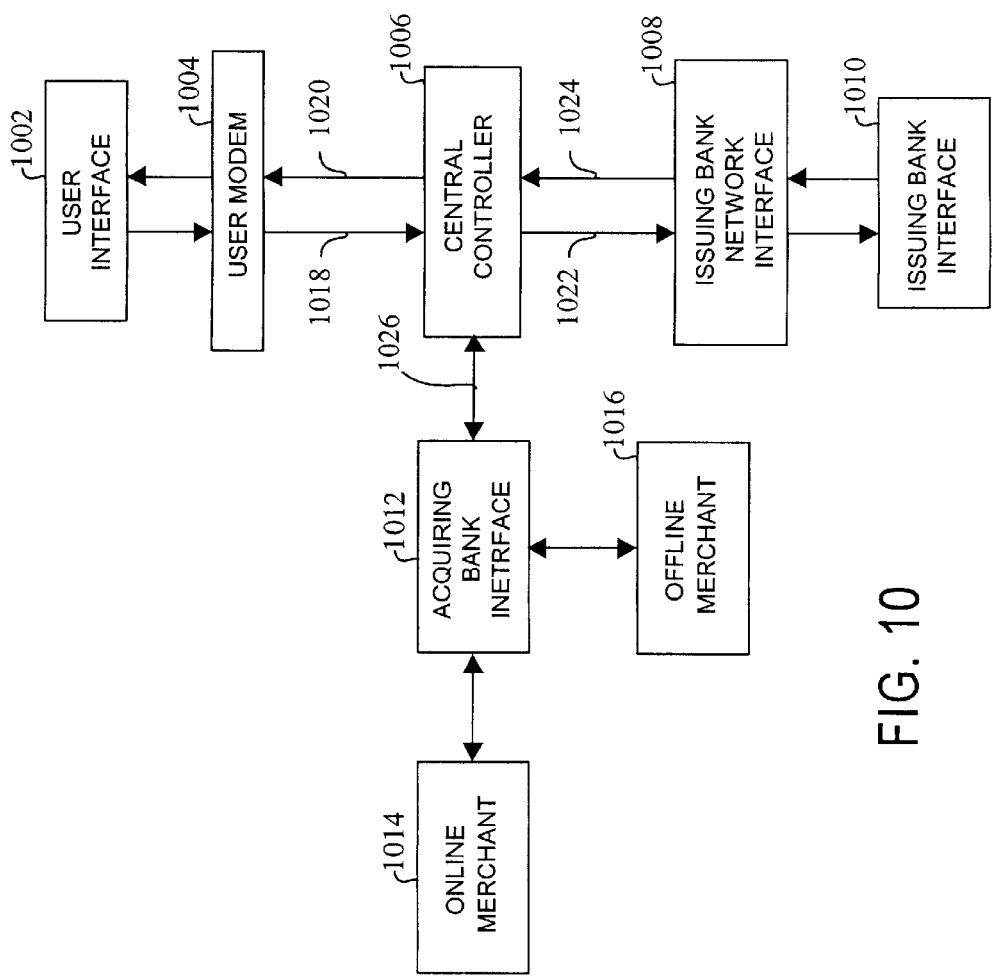
FIG. 10 is a general system diagram for illustrating a subordinate credit/debit card system, according to the present invention.

In FIG. 10, the SCCS includes a user interface 1002, a user modem 1004, a central controller 1006, an issuing bank interface 1010 including associated databases, an issuing bank network interface 1008, an acquiring bank interface 1012, an offline merchant 1016 and an online merchant 1014. The present invention receives a conditional modification data request (CMDR) 1018 from a user, attempts to validates the request and if the request is valid, updates the local subordinate credit/debit card data and sends an update signal 1022 to the card's issuing bank 1010. Thus a user is able to remotely set subordinate card controls, such as balance and transactions limits, etc., via the CMDR 1018.

As shown in FIG. 10, the SCCS includes the user interface 1002, the central controller 1006, the issuing bank interface 1010 and the acquiring bank interface 1012. The above-noted components of the SCCS are referred to as "nodes". Each node is connected, for example, via an Internet connection using a public switch telephone network, such as those provided by a local or regional telephone company. The connection also may be provided by dedicated data lines, cellular, Personal Communication Systems ("PCS"), microwave or satellite networks, etc., as will be appreciated by those skilled in the relevant art(s). The user interface 1002 and issuing bank interface 1010 are the input and output gateways for communications with the central controller 1006.

Figure 11:
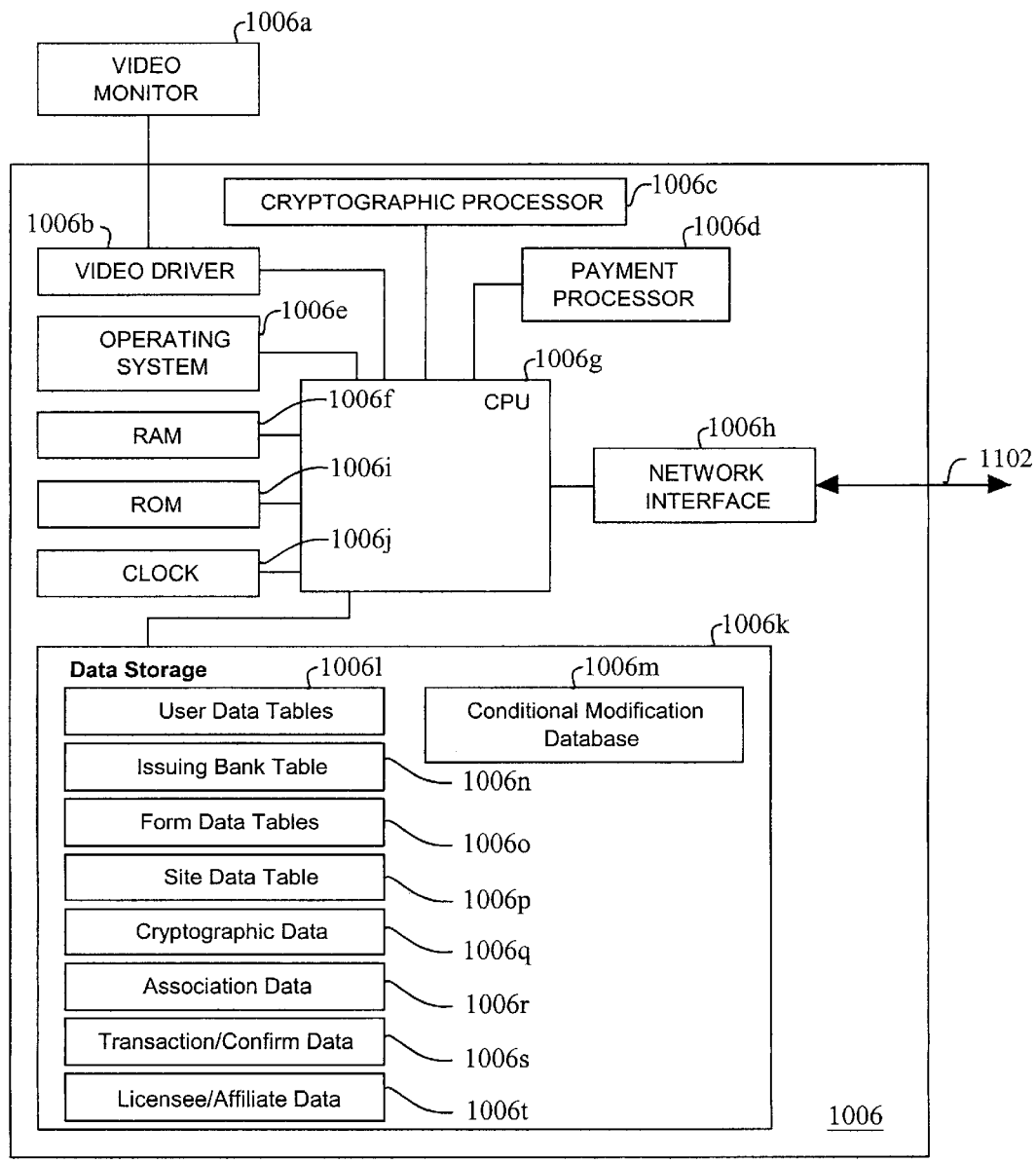
FIG. 11 is a block diagram for illustrating a central controller of the system of FIG. 10, according to the present invention.

Using the above components, the present invention provides a method and system to allow cardholders to update "subordinate card controls," such as those previously described. As shown in FIG. 11, the central controller 1006 includes a central processing unit (CPU) 1006g, cryptographic processor 1006c, RAM 1006f, ROM 1006i, payment processor 1006d, clock 1006j, operating system 1006e, network interface 1006h and data storage device 1006k.

A conventional personal computer or workstation with sufficient memory and processing ability may be used as the central controller 1006. In one embodiment, the central controller 1006 operates as a web server, both receiving and transmitting data generated by users and/or the central Web site. The central controller 1006 typically must be capable of high volume transaction and network processing, performing a significant number of mathematical calculations and network operations in processing communications and database queries.

A cryptographic processor 1006c supports the authentication of communications between the nodes of the SCCS, as well as anonymous/secure transmissions between them. The cryptographic processor 1006c also may be configured as part of the CPU 1006g or may be implemented via software (e.g., using Pretty Good Privacy (PGP) software, etc.). The functions of the cryptographic processor 1006c will be further described in conjunction with cryptographic authentication flow charts of FIGS. 21–24.

A payment processor 1006d includes one or more conventional microprocessors (such as the Intel Pentium III) supporting the transfer and exchange of payments, charges or debits, attendant to the method of the system. The payment processor 1006d also may be configured as part of the CPU 1006g. Processing of credit/debit card transactions by payment processor 1006d may be supported by commercially available software.

A data storage device 1006k may include hard disk, magnetic or optical storage units, as well as CD-ROM Drives, flash memories, etc. The data storage device 1006k contains databases used in the processing of transactions and authentication and includes, for example, user data 1006l, issuing bank data 1006n, form data 1006o, site data 1006p, cryptographic key data 1006q, association data 1006r, transaction/confirmations data 1006s, licensee/affiliate database 1006t and conditional modification data 1006m. In a preferred embodiment, database software manufactured by the Oracle Corporation is used to create and manage the database 1006k.

The user data 1006l includes data, such as a user's name, address, personal information, login and registration information for all of the user's linked sites, etc., as previously described with respect to FIGS. 1–3. The issuing bank data 1006n includes data, such as routing information with respect to communications, transactions, etc. The form data 1006o includes data, such as HTML form data for registered Web sites, etc., as previously described with respect to FIGS. 1–3. The site data 1006p includes data, such as Web site names and associated URLs, etc., as previously described with respect to FIGS. 1–3. The cryptographic key data 1006q includes data for facilitating cryptographic functions, storing both symmetric and asymmetric keys, etc. The keys stored as the cryptographic key data 1006q are used by the cryptographic processor 1006c for encrypting and decrypting transmissions between nodes of the SCCS. Association data 1006r includes data, such as a user's name, address etc., that are associated/referenced to the central controller "user template" form(s), as previously described with respect to FIGS. 1–3. The association data 1006r also includes data, such as a merchant ID number and data for associations, such as vendor type, etc. Multiple types of association data typically are used for the execution of the various embodiments described herein. Transaction/confirmation data 1006s includes data, such as data for tracking all central controller credit/debit card, user and subordinate, transaction/confirmation activity, etc. Licensee/affiliate data 1006t includes data, such as data for logging licensee/affiliate names, identification numbers, etc. and data for tracking licensee/affiliate transactions garnered through a contract relationship with the central Web site. Conditional modification data 1006m includes data, such as data for logging licensee/affiliate names, id numbers, etc. and data for tracking licensee/affiliate transactions garnered through a contract relationship with the central Web site.

A network Interface 1006h is provided as a gateway to communicate with the nodes of the SCCS via signals 1102, which include, for example, signals 1018, 1020, 1022, 1024 and 1026 of FIG. 10. Conventional internal or external modems may serve as the network interface 1006h. The network interface 1006h may include modems at a range of baud rates from 1200 upward, may combine such inputs into a T1 or T3 line if more bandwidth is required. In a preferred embodiment, network interface 1006h is connected to the Internet and/or any of the commercial online services such as America Online or the Microsoft Network, etc., allowing users and issuing banks access from a wide-range of online communications. Alternately, network interface 1006h may be configured as a voice mail interface, Web site, BBS, electronic mail address, etc.

While the above embodiment describes a single computer acting as a central controller 1006, those skilled in the art will realize that the functionality can be distributed over a series of computers. In one embodiment, the central controller 1006 is configured in a distributed architecture, wherein the database 1006k and the processors 1006g, 1006c and 1006d are housed in separate units or locations. In such a case, some controllers perform the primary processing functions and contain at a minimum RAM, ROM and a general processor. Each of these controllers is attached to a WAN hub which serves as the primary communications link with the other controllers and interface devices. The WAN hub may have minimal processing capability itself, serving primarily as a communications router. Those skilled in the art will appreciate that an almost unlimited amount of controllers may be supported. This arrangement yields a more flexible and dynamic system less prone to catastrophic hardware failures affecting the entire system. The hardware for these servers would be configured similarly to that described for the central controller 1006.

Figure 12:
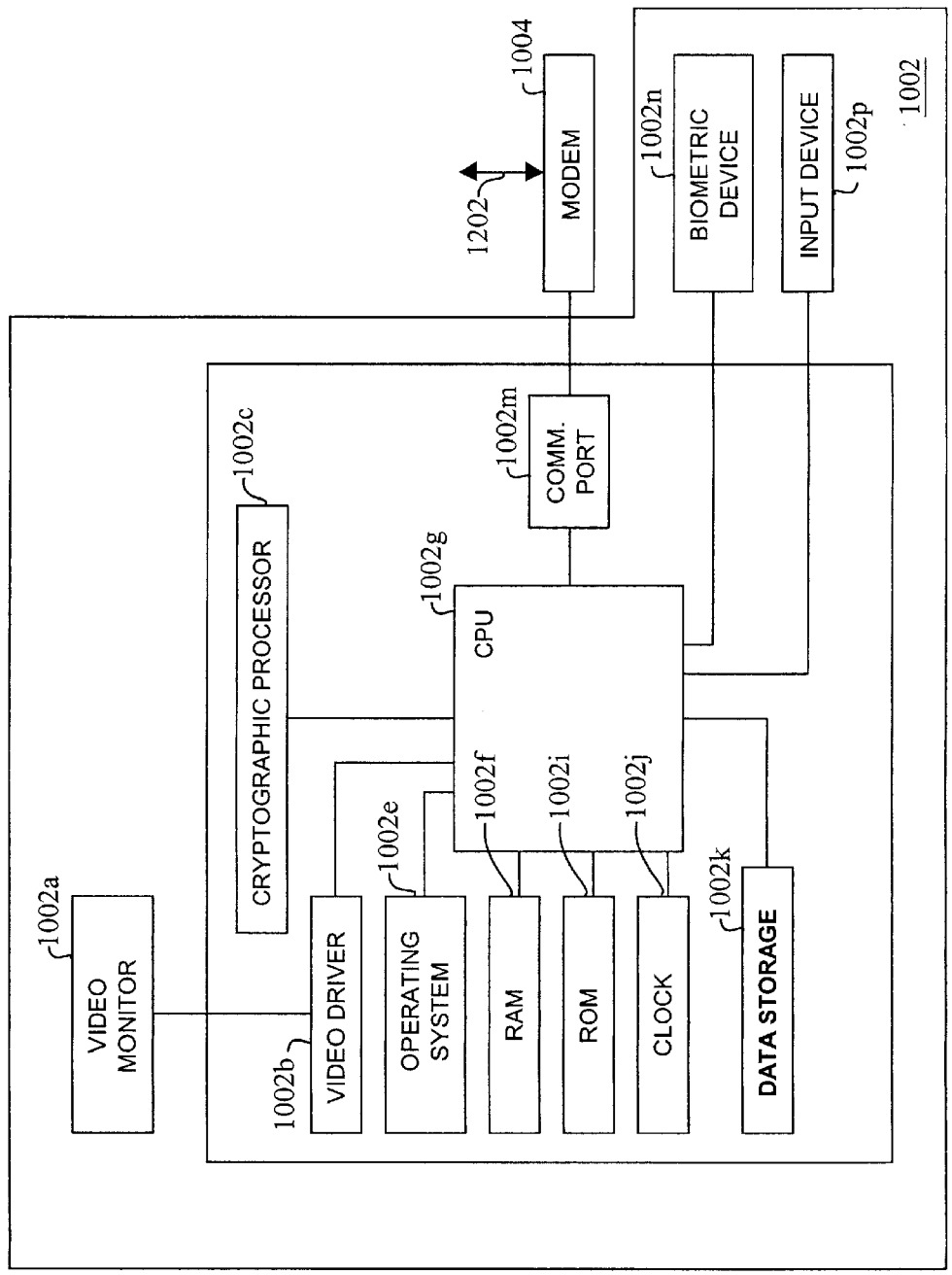
FIG. 12 is a block diagram for illustrating a user interface of the system of FIG. 10, according to the present invention.

FIG. 12 is a block diagram for illustrating the user interface 1002 of the system of FIG. 10. In an exemplary embodiment, the user interface 1002 is a conventional personal computer having an input device 1002p, such as a keyboard, mouse or conventional voice recognition software package, a display device, such as a video monitor 1002a and a processing device, such as a CPU 1002g. The user interface 1002 is coupled to a network interface, such as a modem 1004. The device 1004 interacts with the central controller 1006 via signals 1202, for example, including signals 1018 and 1020 of the system of FIG. 10. Alternatively, the user interface 1002 may be a voice mail system, an electronic or voice communications system, etc. As will be described in later embodiments, devices, such as a facsimile machine, a cellular phone, a PDA, a pager, etc., are also suitable as an interface device 1004.

As shown in FIG. 12, the user interface 1002, for example, includes a central processing unit (CPU) 1002g, RAM 1002f, ROM 1002i, clock 1002j, video driver 1002b, video monitor 1002a, communications port 1002m, input device 1002p, operating system 1002e, biometric device 1002n, cryptographic processor 1002c and data storage device 1002k. The cryptographic processor 1002c and biometric device 1002n are included for performing authentication and cryptographic functions as will be later described. An Intel Corporation Pentium microprocessor may be used for CPU 1002g and/or cryptographic processor 1002c. A clock 1002j, such as a standard chip-based clock etc., is provided and which serves to timestamp messages and other communications.

The modem 1004 typically may not require high-speed data transfers since most conditional modifications and confirmations are short, text-based data. Alternatively, the user interface 1002 may include a network interface, such as the network interface 1006h described in FIG. 11. The data storage device 1002k is a conventional magnetic-based hard disk storage unit such as those manufactured by Western Digital. The cryptographic processor 1002c may be similar to the processor 1006c described in FIG. 11. The biometric device 1002n may be implemented via specialized hardware, firmware and/or software and perform biometric functions, such as a voice recognition, retinal scanning, fingerprint recognition, etc.

Figure 13:
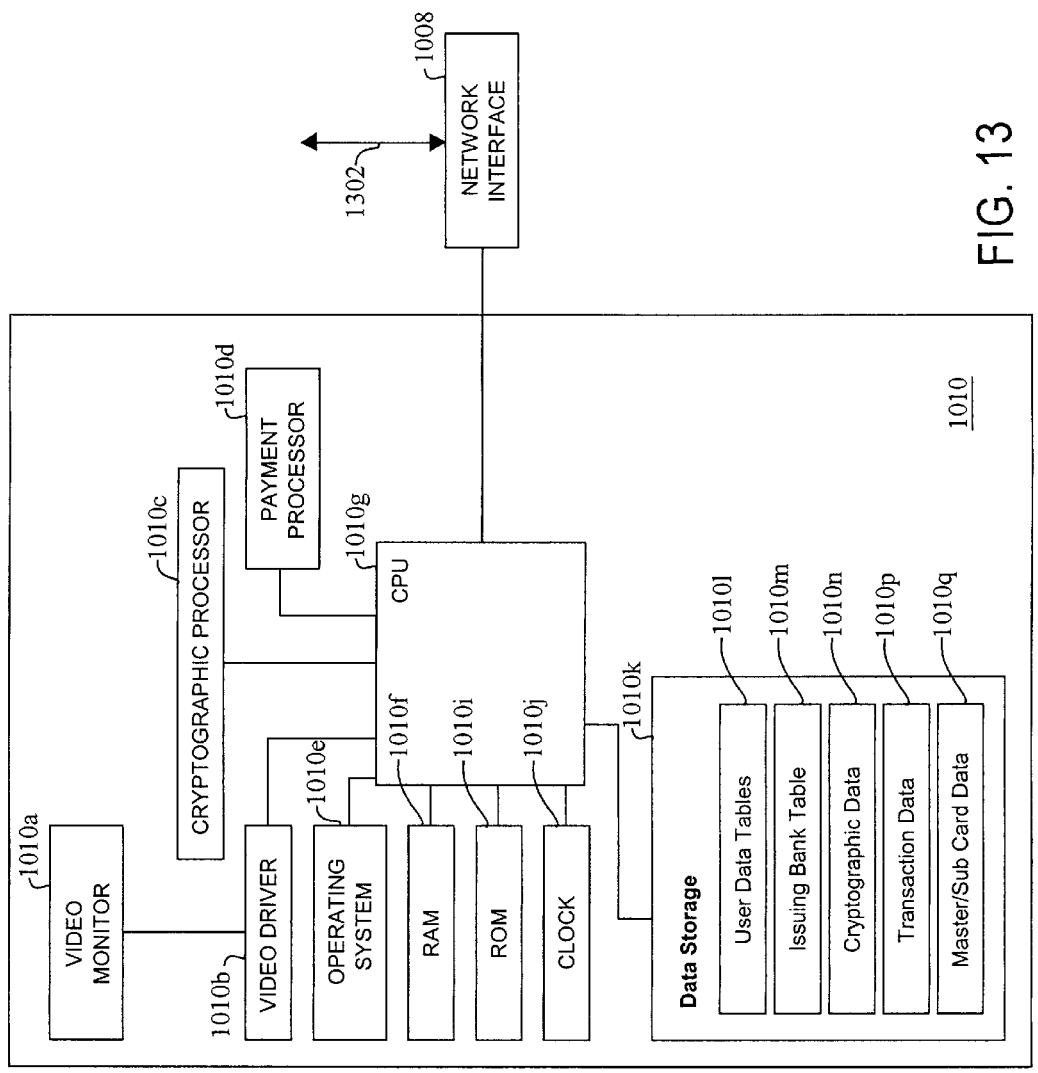
FIG. 13 is a block diagram for illustrating an issuing bank interface of the system of FIG. 10, according to the present invention.

FIG. 13 is a block diagram for illustrating the issuing bank interface 1010 of the system of FIG. 10. In an exemplary embodiment, the issuing bank interface 1010 is a conventional personal computer or workstation with sufficient memory and processing ability and including a processing device, such as a CPU 1010g and coupled to the network interface 1008. The issuing bank interface 1010 interacts with the central controller 1006 via the network interface 1008 and signal lines 1302, which include, for example, signals 1022 and 1024 of FIG. 10. Alternatively, the issuing bank interface 1010 also may be implemented via a voice mail system, an electronic or voice communications system, etc. As will be described in later embodiments, devices, such as a facsimile machine, a cellular phone, a PDA, a pager, etc., are also suitable as an interface device 1008.

As shown in FIG. 13, the issuing bank interface 1010 includes a central processing unit (CPU) 1010g, a cryptographic processor 1010g, RAM 1010f, ROM 1010i, a payment processor 1010d, a clock 1010j, an operating system 1010e and data storage device 1010k. The issuing bank interface 1010 couples to the network interface 1008. The above-noted devices may be similar to the respective devices described with respect to FIGS. 11 and 12.

A conventional personal computer or workstation with sufficient memory and processing ability may be used as the issuing bank interface 1010. The issuing bank interface 1010, typically must be capable of high volume transaction and network processing, performing a significant number of mathematical calculations and network operations in processing communications and database queries. The data storage device 1010k may include hard disk magnetic or optical storage units, as well as CD-ROM Drives, flash memories, etc. The data storage device 1010k stores data used in the processing and authentication of transactions and includes, for example, user data 1010l, issuing bank data 1010m, cryptographic key data 1010n, transaction data 1010p and master/subordinate credit/debit card data 1010q.

Figure 14:
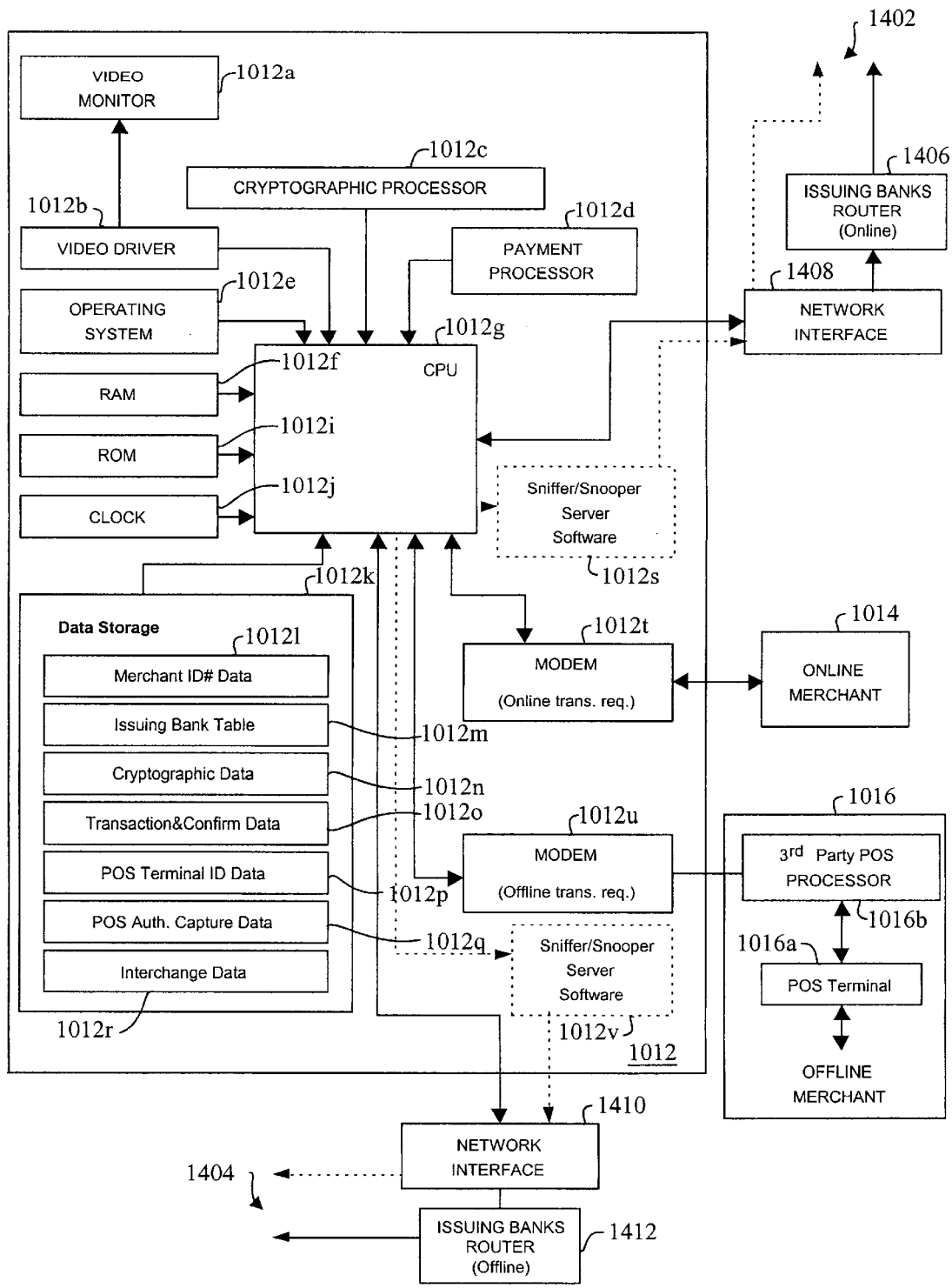
FIG. 14 is a block diagram for illustrating an acquiring bank interface of the system of FIG. 10, according to the present invention.

As shown in FIG. 14, the acquiring bank interface 1012 includes a central processing unit (CPU) 1012g, a cryptographic processor 1012c, RAM 1012f, ROM 1012i, a clock 1012j, a payment processor 1012d, an operating system 1012e, a video driver 1012b, a video monitor 1012a, online issuing bank router 1406, offline issuing bank router 1412, sniffer/snooper server software 1012s and 1012v, network interfaces 1408 and 1410, modem 1012t and 1012u and a data storage device 1012k. The above-noted devices may be similar to the respective devices described with respect to FIGS. 11–13.

A conventional personal computer or workstation with sufficient memory and processing ability may be used as the acquiring bank interface 1012. The acquiring bank interface 1012, typically must be capable of high volume transaction and network processing, performing a significant number of mathematical calculations and network operations in processing communications and database queries.

The payment processor 1012d includes one or more conventional microprocessors (such as the Intel Pentium III) supporting the transfer and exchange of payments, charges or debits, attendant to the method of the system. The payment processor 1012d also may be configured as part of the CPU 1012g. Processing of credit/debit card transactions by payment processor 1012d may be supported by commercially available software.

The data storage device 1012k may include hard disk magnetic or optical storage units, as well as CD-ROM Drives, flash memories, etc. The data storage device 1012k stores data used in the processing/confirmation of transactions and authentication and includes merchant data 1012l, issuing bank data 1012m, cryptographic key data 1012n, transaction/confirmation data 1012o, point-of-sale (POS) terminal identification data 1012p, POS authorization capture data 1012q and interchange data 1012r.

The merchant data 1012l includes data, such as a merchant identification number, used to identify which merchant is requesting a purchase request, etc. The interchange data 1012r includes data, such as confirmation of a final payment of a purchase request, after it has been reconciled and all parties are paid, etc. This data 1012r includes data related to interchange fees paid to issuing bank(s) for payment processing of each credit/debit card transaction. The POS terminal ID data 1012p includes data used to identify a POS terminal, which requested an initial transaction, etc. The POS terminal ID number is used to send back a transaction confirmation/rejection to a corresponding POS terminal. The POS authorization capture database 1012q includes data, such as electronic data capture data from a POS unit, which represents an electronic signature version of a traditional "signed" sales draft, etc.

The issuing bank routers 1406 and 1412 are used by the acquiring bank interface to forward credit/debit card purchase requests to the central controller 1006 and/or a corresponding issuing bank for payment processing via signal lines 1402 and 1404, which include, for example, signals 1026 of FIG. 10. The sniffer/snooper server software 1012s and 1012v may be provided in the acquiring bank interface 1012 as an alternative method of forwarding the central controller's 1006 credit/debit card purchase requests for the central controller 1006 to process.

The operation of the above-described system will now be described with reference to FIGS. 15–24. The present invention effectuates communications between a user and the central controller 1006, via electronic networks, with the central controller 1006 acting as a Web server. The user logs onto the central controller 1006, creates CMDR 1018 and then transmits the CMDR 1018 to the central controller 1006. The CMDR 1018 is received and processed by the central controller 1006. If CMDR 1018 is valid, the central controller 1006 updates the subordinate card information and transmits all non-local changes to the issuing bank interface 1010.

Figure 15:
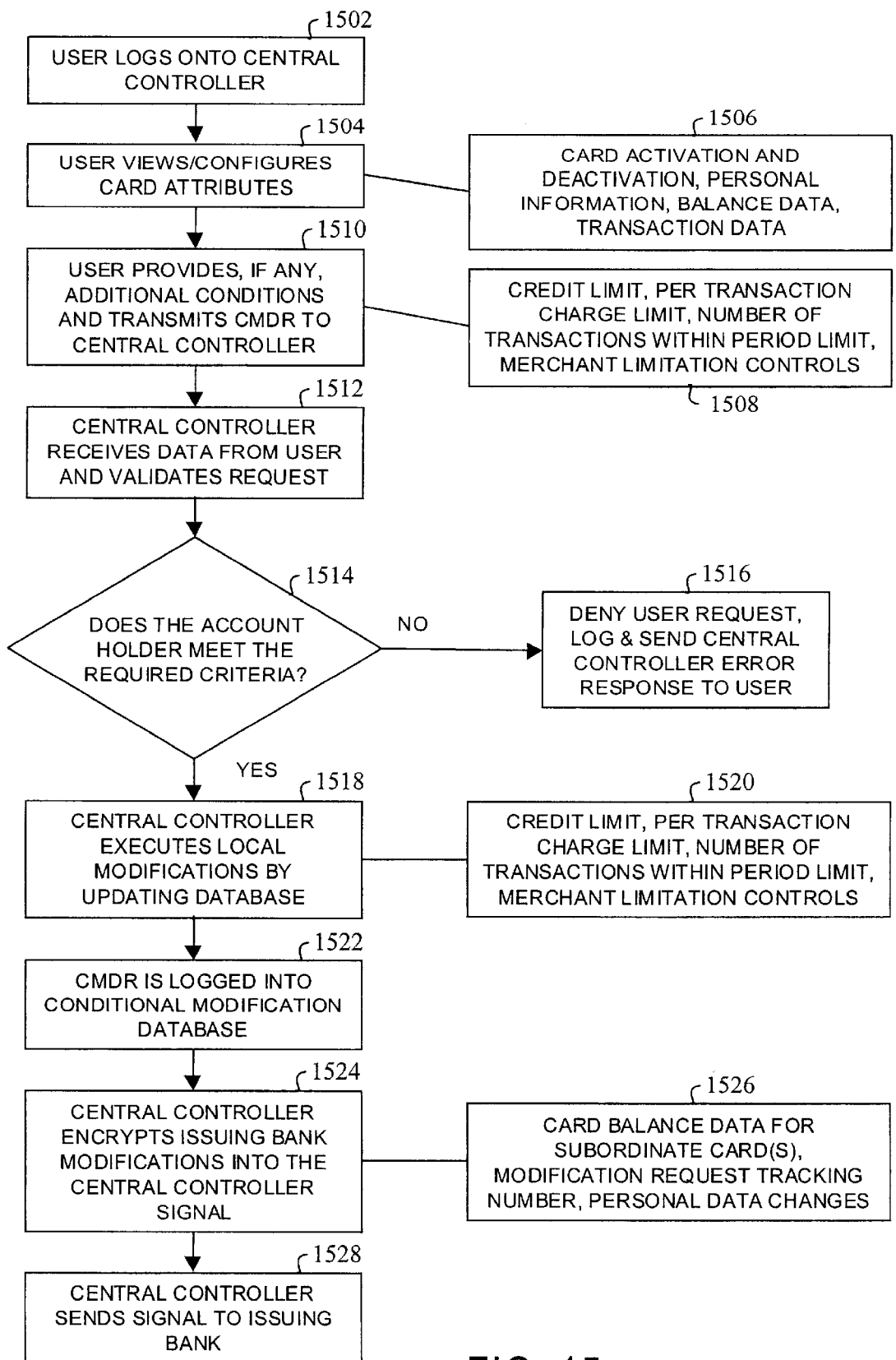
FIG. 15 is a flow chart for illustrating the operation of the central controller of FIG. 10, according to the present invention.

With reference to FIG. 15, there is a described process by which a user formulates and transmits a CMDR 1018. At step 1502, the user logs onto the central controller 1006 via user modem 1004 and user interface 1002, establishing a communications link. It should be noted that the user might be an individual, a corporation, a partnership, a government agency or any other entity. There are many commercial software applications that can enable the communications required by the issuing bank interface 1010 or the user interface 1002. When the central Web site controller 1006 is configured as a web server, conventional communications software, such as Microsoft Corporation's Internet Explorer Web browser, etc., may be used. The user and issuing bank may use the Internet Explorer browser to transmit CMDR 1018. Thus, no proprietary software typically is required.

At step 1504, a Web page with form(s) is displayed on the video monitor 1002a of user interface 1002 where the user views and/or configures user and/or subordinate card controls. Form(s) might include a combination of fields, lists, checkboxes, other web page form elements, etc., each representing a condition of the CMDR 1018. As shown by element 1506, card controls include, for example, activation or deactivation of subordinate card(s), user personal information, balance data, transaction data, etc.

At step 1510, the user configures additional user and/or subordinate card conditions. As shown by element 1508, additional conditions include, for example, subordinate card credit limits, per transaction charge limits, number of transactions allowed during a given period of time limits, merchant/vendor control limitation(s), etc. Once the user is satisfied with the CMDR 1018, the user transmits the CMDR 1018 to the central controller 1006. The user does this, for example, by clicking on a "submit" button located on the Web page on which they created the CMDR 1018.

Instead of a Web-based interface, a user may transmit the CMDR 1018 via electronic mail, voice mail, facsimile, postal mail transmissions, wireless transmissions, PDAs, cellular transmission, etc. With a voice mail transmission, the user calls the central controller 1006 and leaves the CMDR 1018 in audio form. These requests may be transcribed into digital text at the central controller 1006 or kept in their original format. In a postal mail embodiment, requests may be transcribed into digital text at the central controller 1006 or kept in their original format. The CMDR 1018 also may be posted to bulletin boards or web pages operated by the central controller 1006. The central controller 1006 supports a plurality of transmission methods allowing for a wide variety of transmission formats for the CMDR 1018. Some formats may be changed, however, before further processing by the central controller 1006. The CMDR 1018 transmitted by mail in paper form, for example, may be scanned-in and digitized, using optical character recognition software to create digital text.

At step 1512, the central controller 1006 receives the CMDR 1018 from the user and attempts to validate the user's CMDR 1018 at step 1514. If it is determined that the user does not meet all of the required criteria for their CMDR 1018 or if any attribute or condition of the CMDR 1018 is either unclear or contains spelling and/or grammatical errors, the CMDR 1018 is denied and returned for clarification and/or correction and the error is logged in to the conditional modification database 1006m at step 1516.

If, however, the CMDR 1018 is determined to be valid, central controller 1006 executes local changes, such as credit limitations, per transaction charge limitations, number of transactions within a period limit etc., shown by element 1520, at step 1518.

At step 1522, the CMDR 1018 is logged in to the conditional modification database 1006m. At step 1524, central controller 1006 encrypts issuing bank modifications into the central controller signal 1022. At step 1528, the central controller signal 1022 is transmitted to the issuing bank.

Figure 16:
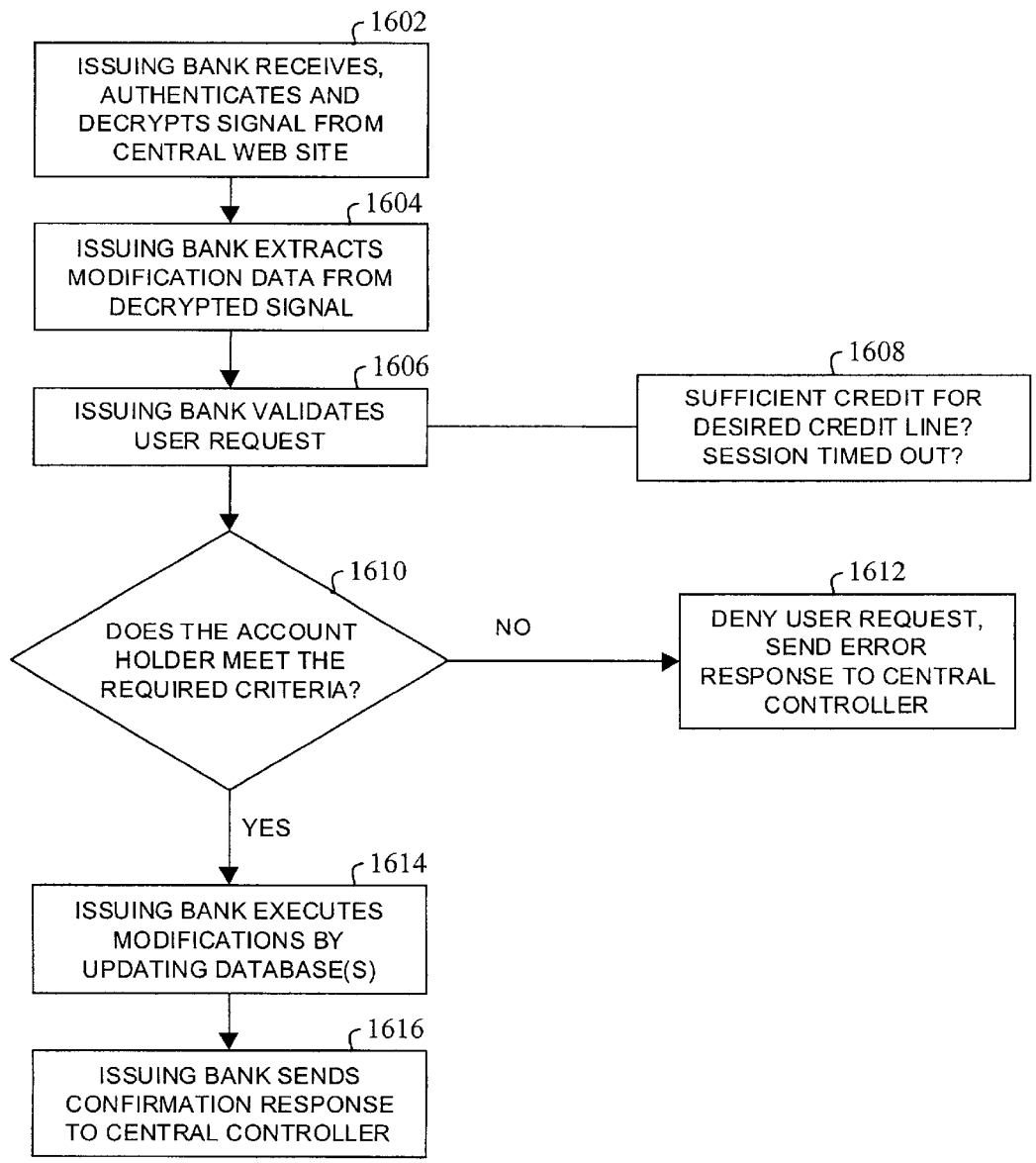
FIG. 16 is a flow chart for illustrating the operation of the issuing bank interface of FIG. 10, according to the present invention.

With reference to FIG. 16, there is described a process by which the issuing bank interface 1010 receives and processes the signal 1022 sent from the central controller 1006. At step 1602, the issuing bank network interface 1008 receives the signal 1022 that contains the encrypted modification data from the central controller 1006 and the issuing bank interface 1010 decrypts the same. At step 1604, the issuing bank interface 1010 extracts the conditional modification data from the decrypted central controller 1006 signal 1022.

At step 1606, the issuing bank interface 1010 attempts to validate the changes from central controller 1006 signal 1022. Exemplary criteria for changes are shown by element 1608, such as the user having a sufficient credit line in order to modify a subordinate card, whether a session timeout has occurred, etc. At step 1610, it is determined whether or not the user meets all of the required criteria for modifications. If any attribute or condition of the modifications is either unclear or contains spelling and/or grammatical errors, modifications are denied and an error issuing bank response 1024 is returned to the central controller 1006 and the central controller 1006 sends an appropriate response 1020 to the user at step 1612.

If, however, the modifications are valid, the issuing bank interface 1010 executes the changes, such as card balance data levels for subordinate card(s), modification request tracking number, personal data changes etc., at step 1614. At step 1616, a confirmation issuing bank response 1024 is transmitted to the central controller 1006 and the central controller 1006 sends an appropriate response 1020 to the user.

FIG. 17 is a signal diagram for illustrating the signal 1020 format. In FIG. 17, the signal 1020 includes, for example, a field 1702 for transmitting a primary or master credit/debit card account number, a field 1704 for transmitting a subordinate credit/debit card account number, a field 1706 for transmitting balance modification changes for the subordinate credit/debit card, a field 1708 for transmitting personal data changes for the subordinate credit/debit card, a field 1710 for transmitting the central controller 1006 identification number and a field 1712 for transmitting a modification request tracking number. Although a signal format is shown for only signal 1022, similar signal formats may be used for signals 1018, 1020, 1024, etc., as will be appreciated by those skilled in the relevant art(s).

FIG. 18 is a data structure diagram for illustrating a data structure format used by the database 1006k of the central controller 1006. In FIG. 18, the data structure includes, for example, a field 1802 for storing a primary or master credit/debit card account number, a field 1804 for storing a subordinate credit/debit card account number, a field 1806 for storing desired/confirmed balance data history for the subordinate credit/debit card, a field 1808 for storing personal data history for the subordinate credit/debit card, a field 1810 for storing a master central controller user identification number, a field 1812 for storing the subordinate credit/debit card transaction request/confirmation data history, a field 1814 for storing a subordinate central controller user identification number, a field 1816 for storing master user restrictions on the subordinate credit/debit card and a field 1818 for storing the subordinate credit/debit card control history. Although a data structure format is shown for only database 1006k, similar signal formats may be used for databases 1002k, 0100k, 1012k, etc., as will be appreciated by those skilled in the relevant art(s).

Figure 19:
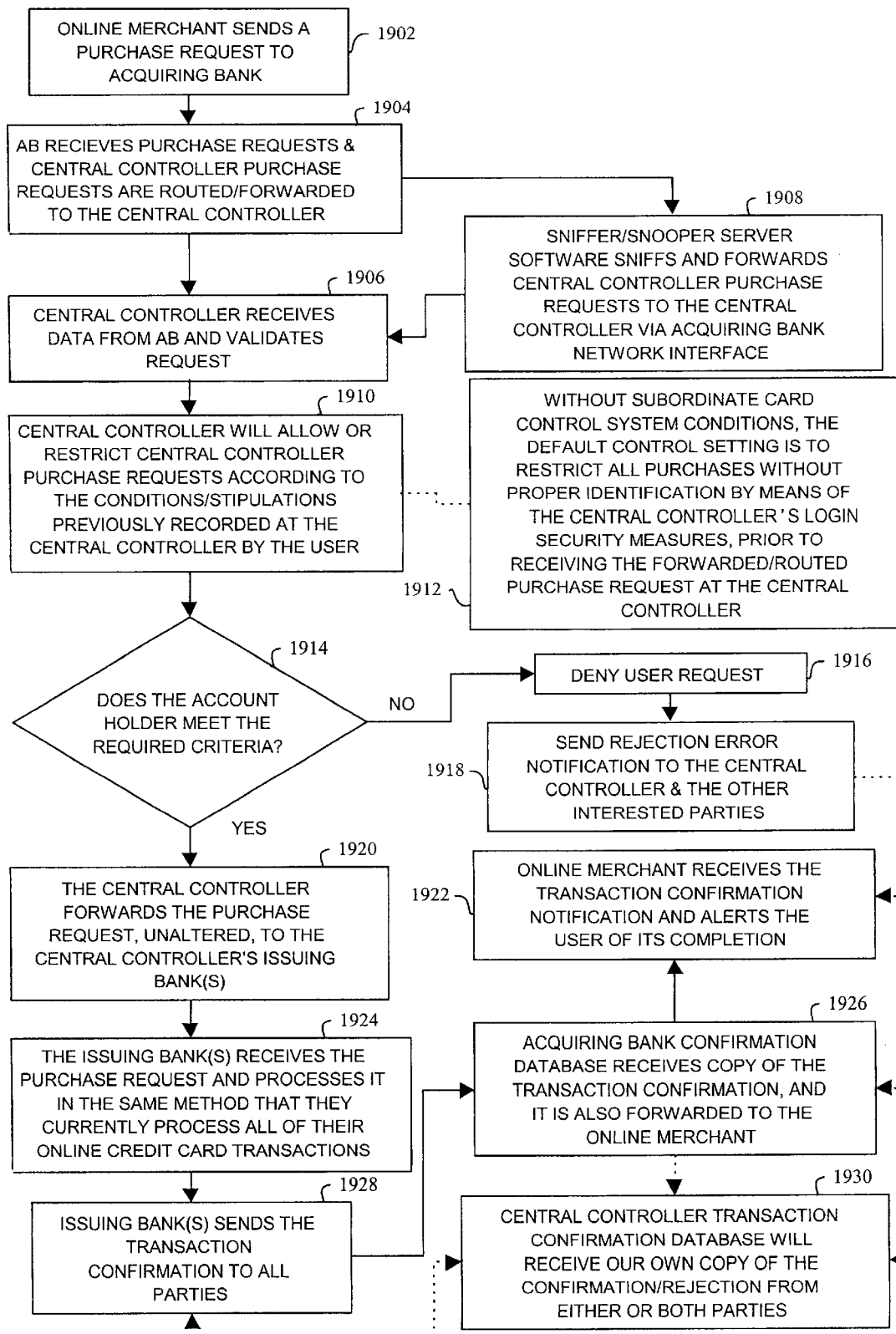
FIG. 19 is a flow chart for illustrating processing of an online transaction in the system of FIG. 10, according to the present invention.

With reference to FIG. 19, there is described a process by which a credit/debit card purchase request is sent from the online merchant 1014 to the SCCS user's credit/debit card network (represented by the acquiring bank interface 1012) for online transaction payment processing. In FIG. 19, at step 1902, the online merchant 1014 sends a purchase request associated with a central controller 1006 transaction to the acquiring bank interface 1012. At step 1904, the acquiring bank interface 1012 receives the purchase request and either forwards the purchase request to the central controller 1006 at step 1906 or routes the purchase request to the central controller 1006 at step 1908.

In either case, at step 1906, the central controller 1006 receives the routed or forwarded request and then attempts to validate the purchase request. At step 1910, the central controller 1006 allows or restricts purchases according to the conditions/stipulations shown by element 1912 input by the "master" user in the embodiment detailed in FIG. 15. If the purchase request satisfies the conditions set forth in the CMDR 1018 at step 1914, then the request is forwarded on to the issuing bank interface 1010 for the requested SCCS card account at step 1920. However, if the request does not satisfy the conditions set forth in the CMDR 1018 at step 1914, then the purchase request is denied at step 1916 and a rejection error notification is sent to all interested parties at step 1918 (see step 1930, step 1926 and step 1922 respectively).

At step 1924, the issuing bank interface 1010 receives and processes the payment of the purchase request using known methods for processing credit/debit card transactions. After the purchase request is processed and given a confirmation number, the issuing bank network interface 1008 sends a transaction confirmation to all interested parties at step 1928 (see step 1930, step 1926 and step 1922 respectively).

Figure 20:
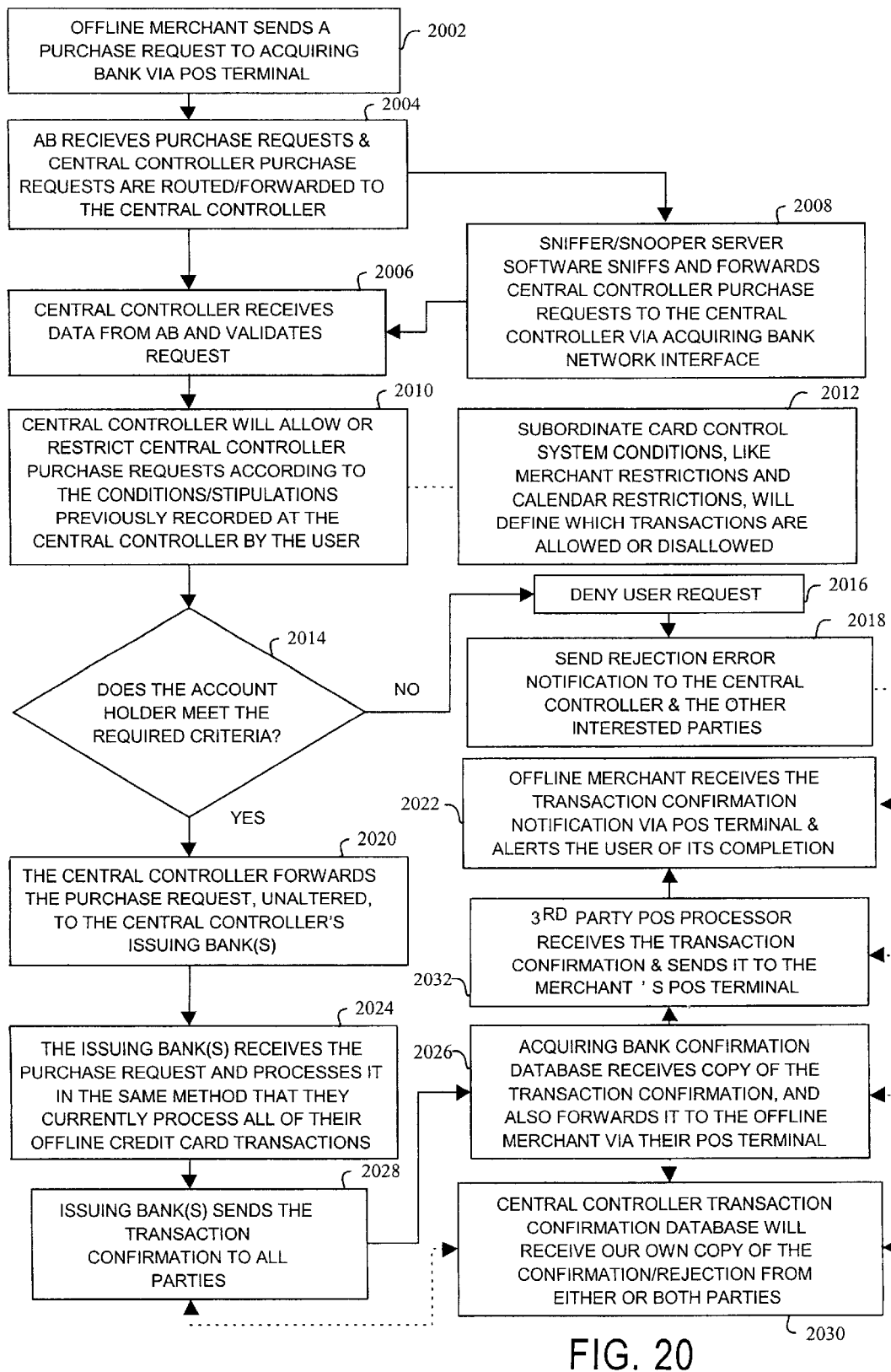
FIG. 20 is a flow chart for illustrating processing of an offline transaction in the system of FIG. 10, according to the present invention.

With reference to FIG. 20, there is described a process by which a credit/debit card purchase request is sent from an offline merchant to the SCCS user's credit/debit card network (represented by acquiring bank interface 1012) for offline transaction payment processing. In FIG. 20, the SCCS offline transaction payment method is similar to the method described in FIG. 19, with one additional step, step 2032. In addition, in the offline transaction payment method, steps 2002, 2022, 2032 and 2026 show the additional role of the point-of-sale (POS) processing and POS terminal, used in the offline credit/debit card payment procedures. The remaining details of the steps of the offline transaction payment method are omitted for the sake of brevity.

In the previous embodiments, authentication of a user and an issuing bank involve checking an attached identification or name and comparing it with those with the stored user data 1006l and the issuing bank data 1006n, of the database 1006k of the central controller 1006. Although this procedure works well in a low security environment, it can be significantly improved through the use of cryptographic protocols. These protocols not only enhance the ability to authenticate a sender of a message, but also serve to verify the integrity of the message itself, verifying that the message has not been altered by an unauthorized party. Using such cryptographic protocols, an unauthorized party is prevented from impersonating a user.

Encryption can also prevent eavesdroppers from learning the contents of a message. Thus using such cryptographic protocols, an unauthorized party can be prevented from intercepting messages, for example, sent to/from the central controller 1006, the user interface 1002, the issuing bank interface 1010, the acquiring bank interface 1012, etc. Such techniques shall be referred to generally as cryptographic assurance methods and include the use of both symmetric and asymmetric keys as well as digital signatures and hash algorithms that are known in the cryptographic art(s). The practice of using cryptographic protocols to ensure the authenticity of senders as well as the integrity of messages is well known in the art and will not be described in detail herein for the sake of brevity.

Figure 21:
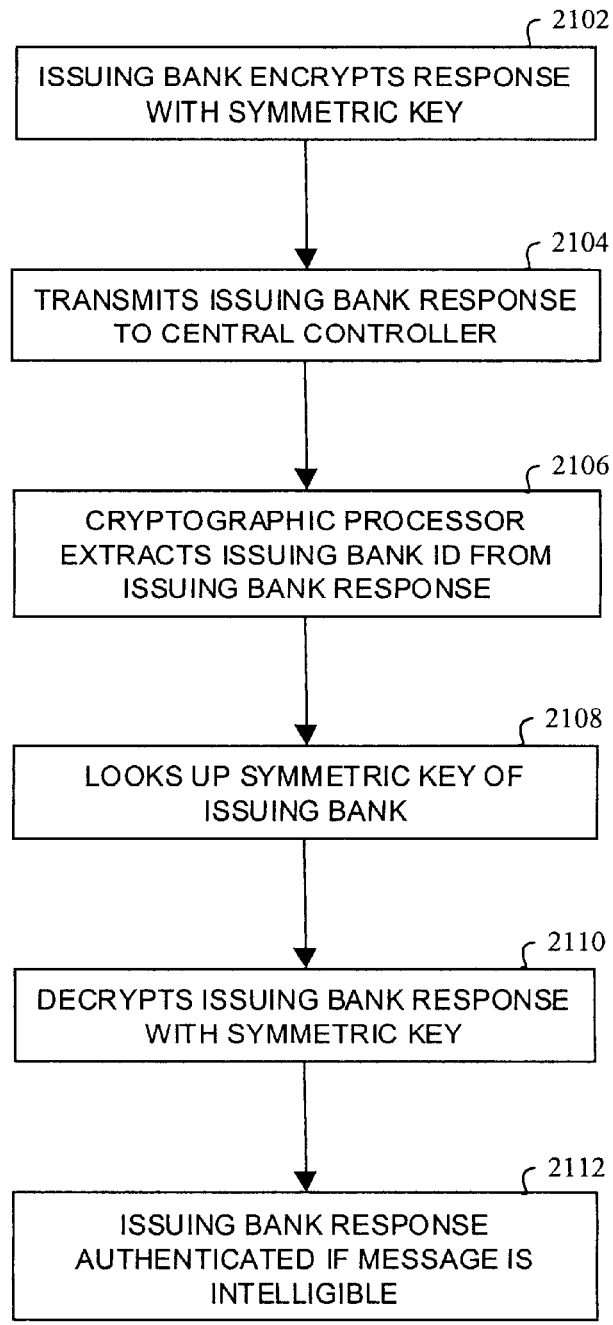
FIGS. 21–24 are flow charts illustrating various encryption techniques used by an issuing bank of FIG. 10, according to the present invention.

FIG. 21 is a flow chart for describing a symmetric key cryptographic method in which the central controller 1006 and issuing bank interface 1010 share a key. Thus, both encryption and decryption of the issuing bank response 1024 are done with the same key. This encryption may be implemented with any known encryption algorithms, such as DES (U.S. Government Standard), IDEA, Blowfish, RC2, RC4, SAFER, etc. In FIG. 21, the issuing bank interface 1010 encrypts the issuing bank response 1024 with the assigned symmetric key at step 2102, using cryptographic processor 100g of issuing bank interface 1010. The key is stored, for example, as the cryptographic key data 1010n of the issuing bank interface 1010. The encrypted response 1024 is then transmitted by the issuing bank network interface 1008 to the cryptographic processor 1006c of central controller 1006 at step 2104. The cryptographic processor 1006c extracts the issuing bank ID from issuing bank response 1024 at step 2106 and looks up the symmetric key of the issuing bank via the cryptographic key data 1006q at step 2108 and decrypts the issuing bank response 1024 with this key at step 2110.

The cryptographic key data 101 On and 1006q contain algorithms and keys for encrypting, decrypting and/or authenticating messages. At step 2112, if the resulting message is intelligible, then the same key must have encrypted the message, authenticating that the issuing bank interface 1010 must have indeed been the author of the issuing bank response 1024.

The above procedure makes it significantly more difficult for an unauthorized issuing bank or third party to represent itself as a legitimate issuing bank. Without cryptographic procedures, an unauthorized issuing bank or third party that obtained a sample issuing bank response 1024 from a legitimate issuing bank would be able to extract the issuing bank identification (ID) number and then attach this ID number to unauthorized issuing bank responses. When issuing bank response 1024 has been encrypted with a symmetric key, however, an unauthorized issuing bank obtaining a sample issuing bank response 1024 only discovers the issuing bank's ID number, not the symmetric key. Without this key, the unauthorized issuing bank or third party cannot create an issuing bank response that will not be discovered by the central controller 1006, since it cannot encrypt its message in the same way that an authorized issuing bank could. The symmetric key protocol also ensures that the issuing bank response 1024 has not been tampered with during transmission, since alteration of the message requires knowledge of the symmetric key. An encrypted issuing bank response 1024 also provides the issuing bank with more anonymity.

Figure 22:
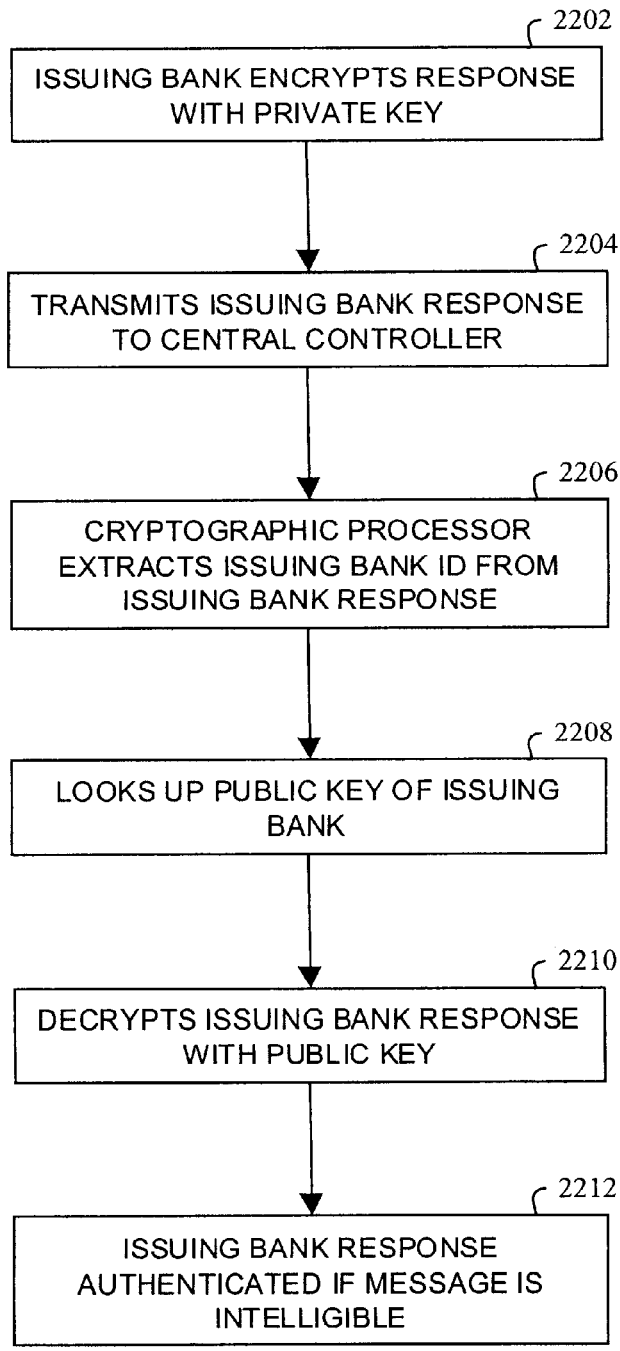

Referring now to FIG. 22, there is shown a flow chart for an asymmetric key protocol method in which the issuing bank response 1024 is encrypted with a private key and decrypted with a public key. Two such algorithms for this procedure are, for example, RSA and Digital Signature Algorithm (DSA). In FIG. 22, the issuing bank interface 1010 encrypts the issuing bank response 1024 with a private key at step 2202, using cryptographic processor 1010c of the issuing bank interface 1010. The encrypted issuing bank response 1024 is then transmitted to the cryptographic processor 1006c of the central controller 1006 at step 2204. The cryptographic processor 1006c extracts the issuing bank ID from the issuing bank response 1024 at step 2206 and looks up the issuing bank's associated public key stored as the cryptographic key data 1006q at step 2208 and decrypts the issuing bank response 1024 with this public key at step 2210. As before, if the issuing bank response 1024 is intelligible then the central controller 1006 has authenticated the issuing bank response at step 2112. Again, an unauthorized party obtaining the issuing bank response 1024 before it is received by central controller 1006 is not able to undetectably alter the issuing bank response 1024, since the unauthorized party typically does not know the private key of the issuing bank. The unauthorized party would, however, be able to read the issuing bank response 1024, if the unauthorized party managed to obtain the public key of the issuing bank. Message secrecy is maintained, however, if the issuing bank interface 1010 encrypts the issuing bank response 1024 with a public key, requiring the attacker to know the issuing banks private key to view the issuing bank response 1024.

Figure 23:
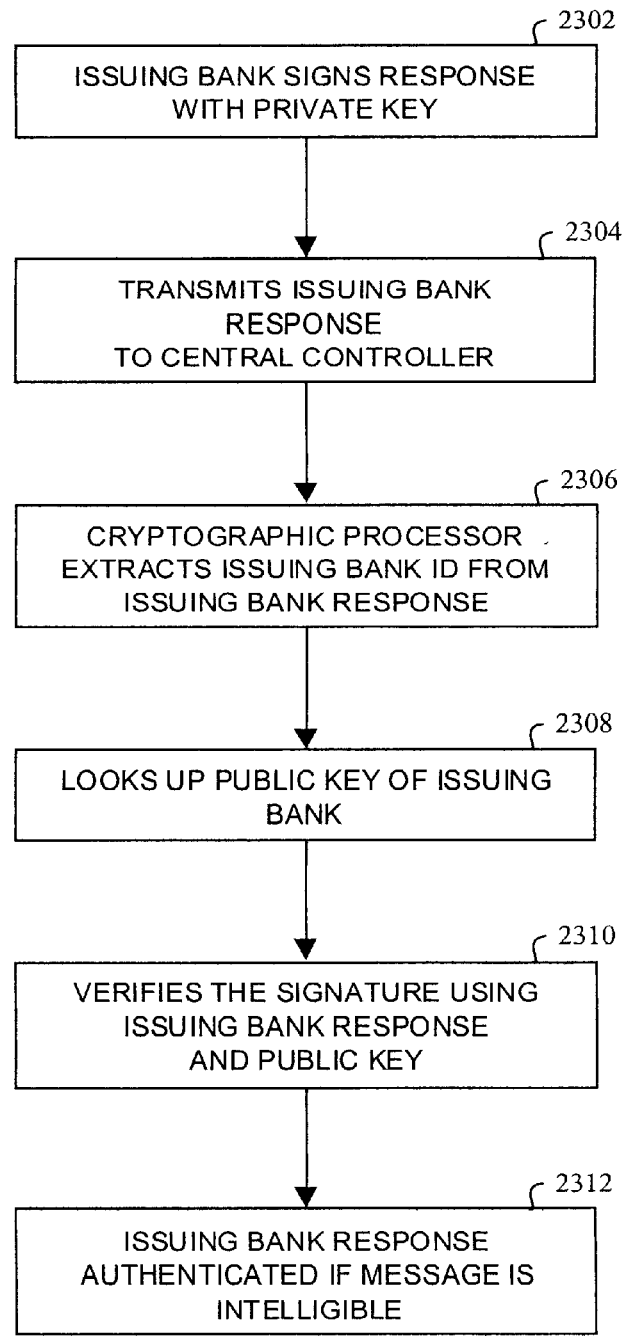

FIG. 23 is a flow chart for illustrating a cryptographic technique using digital signatures to provide authentication and message integrity. One such algorithm is, for example, DSA, the U.S. Government standard specified in FIPS PUB 186. As in the asymmetrical protocol described above, each issuing bank has an associated public and private key. In FIG. 23, the issuing bank interface 1010 signs the issuing bank response 1024 with a private key at step 2302 via the cryptographic processor 1010c and transmits the signed issuing bank response 1024 to the central controller 1006 at step 2304. The central controller 1006 cryptographic processor 1006c extracts the issuing bank ID at step 2306 and looks up the issuing bank's associated public key stored as the cryptographic key data 1006q at step 2308, verifying the signature using the issuing bank response 1024 and the public key of the issuing bank at step 2310. If the issuing bank response 1024 is intelligible, then the central controller 1006 accepts the issuing bank response 1024 as authenticated at step 2312.

Figure 24:
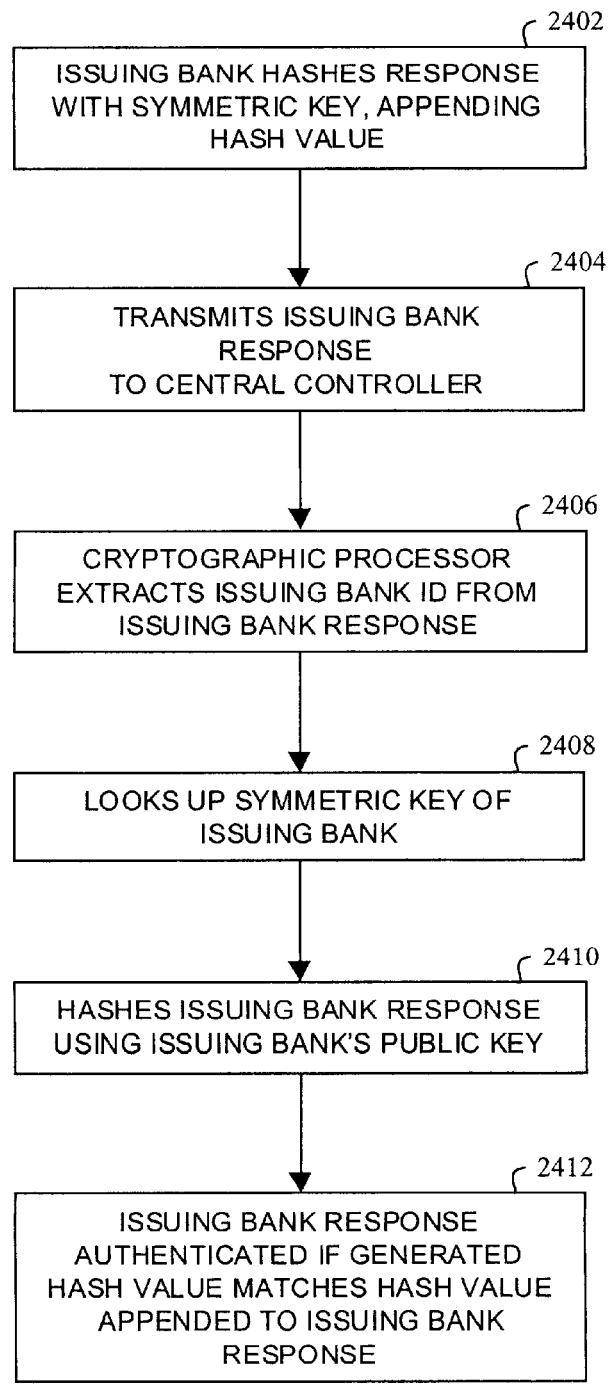

FIG. 24 is a flow chart for describing a cryptographic technique using a hash protocol method for verifying the authenticity and integrity of the issuing bank interface 1010 response 1024. In the hash protocol method, the issuing bank interface 1010 and the central controller 1006 share a symmetric key, which the issuing bank interface 1010 includes in a hash of the issuing bank response 1024 at step 2402. In the hash protocol, a one-way function is applied to a digital representation of the issuing bank response 1024, generating a code that acts very much like a fingerprint of the issuing bank response 1024. Any known hashing algorithm, such as a MAC-based algorithms, etc. (e.g., RIPE-MAC, IBC-Hash, CBC-MAC, etc.), may be applied in the present method. After the issuing bank response 1024 is transmitted to the central controller 1006 at step 2404, the cryptographic processor 1006c extracts the issuing bank ID from issuing bank response 1024 at step 2406. Then, at step 2408, the cryptographic processor 1006c looks up the issuing bank's symmetric key stored as the cryptographic key data 1006q, hashes the issuing bank response 1024 with the symmetric key at step 2410 and compares the resulting hash value with the hash value attached to the issuing bank response 1024 at step 2412. If the values match, the integrity of the issuing bank response 1024 is verified along with the authenticity of the issuing bank.

Although the above cryptographic methods describe the authentication and validation of the issuing bank response 1024, such methods may be equally applied to the authentication and validation of confirmation messages, error messages or any other messages and communications from/to the user interface 1002, the central controller 1006, the issuing bank interface 1010, the acquiring bank interface 1010, etc. (e.g., signals 1018, 1020, 1022, 1026, etc.), as will be appreciated by those skilled in the relevant art(s).

Although cryptographic techniques can provide greater confidence in the authenticity of messages between nodes of the SCCS, such techniques are useless if the cryptographic keys are compromised. If the cryptographic keys are compromised, there is no way to verify if an authorized user was the true author of a message or if the message was transmitted by an authorized party having using compromised cryptographic keys. One way to solve this problem is to use biometric devices, such as a fingerprint readers, voice recognition systems, retinal scanners, etc., to further verify a user's true identity. These devices incorporate a physical attribute of the user into their message, which is then compared with the value stored in a database, for example, located at the central controller 1006. In the present invention, such devices may be attached to the user interface 1002. Fingerprint verification, for example, may be executed before the creation of the CMDR 1018, in response to prompts from the central controller 1006 or at some other pre-determined or random time. Each live-scan fingerprint, for example, is compared to a previously stored template, stored in the data storage device 1002k of the user interface 1002 and if the prints do not match, the CMDR 1018 would be denied.

In a voice verification embodiment, the user's voice is used to verify the user's true identity. This embodiment has the advantage of not requiring the use of any specialized hardware since it can be implemented over a standard phone connection. The user's identity is verified at the central controller 1006. The process of obtaining a voice-print and subsequently using it to verify a person's identity is a well-known in the art and will not be described in detail herein for the sake of brevity. Any CMDR 1018 received without an appropriate voice match would be denied.

Although the above-described biometric methods describe the authentication and validation of the CMDR 1018, such methods may be equally applied to the authentication and validation of confirmation messages, error messages or any other messages and communications from/to the user interface 1002, the central controller 1006, the issuing bank interface 1010, the acquiring bank interface 1010, etc. (e.g., signals 1018, 1020, 1022, 1026, etc.), as will be appreciated by those skilled in the relevant art(s).

As previously mentioned, the present invention provides for the anonymity of both a user and an issuing bank. Such anonymity is accomplished by eliminating all references to the actual names of the involved parties for all transactions. A user, for example, would include the user's ID in the CMDR 1018 instead of the user's name, preventing attackers from discovering the user's true identity. In a similar manner, issuing banks may also want to keep their identity a secret. Although using ID numbers can provide anonymity, there are a number of potential weaknesses. First, if the database of ID numbers, stored as the user data 1006*l* or the issuing bank data 1006*n* is compromised, anonymity is destroyed since the message sender can be looked up in via the user data 10061 or the issuing bank data 1006*n*. To prevent this, all data is encrypted with a public key of the central controller 1006 so that even if such data is stolen it is useless without a private key. In a similar manner, all data stored by the user interface 1002, the issuing bank interface 1010 and the acquiring bank interface 1012 may be similarly encrypted before storage.

General Features of the Present Invention

The above-described system will provide the user the "power" over precisely when and how much of the user's finances will be active on the Internet and will provide parents with control over their children's online and offline transactions. The central Web site online credit/debit card account number typically can only be used for online purchases at e-commerce sites and at credit/debit card service Web sites and typically will have no other real-world application. This is to prevent the use of these new online credit/debit card account numbers in all types of fraud. If the online credit/debit card account numbers are ever stolen, they are essentially useless, since the thief will never really know when the online credit/debit card accounts are ever "active" and/or how much money is available therein.

With the online credit/debit card account system, the user will have an acceptable level of risk during e-commerce transactions. The ability to protect a user's privacy and limit financial risk exposure during e-commerce transactions will result in the growth of e-commerce due to the increased security afforded by the present invention. Accordingly, the online credit/debit card account system according to the present invention will generate more new credit/debit card accounts for the financial institution(s), which will support the online credit/debit card account system, due to the new sense of security provided to the end user.

Since no actual credit/debit "cards" typically need to be manufactured according to some embodiments of the present invention, the money saved from eliminating the need to manufacture cards can be used to help pay for the development costs involved to coordinate the central Web site's "update file" with each financial institution's own database table of accounts.

If a user does not already have an online credit/debit card account at the central Web site, then the user has to create such an account in order to take advantage of the central Web site's service and credit/debit card account protection benefits. After the online credit/debit card account is created, the user will not have to write down, register or re-register this new online credit/debit card account number at new e-commerce, credit/debit card and auction sites or the user's preferred Web sites. The central Web site's database and service software solve those problems for all users, by means of the user "template" registration feature, as described with respect to FIGS. 1 and 2.

If the user already does have a personal Web page at the central Web site, then the balance information and account number of the user's new online credit/debit card account is cross-referenced and coded with the user's personal Web page in the database 122. By using these online credit/debit card account numbers in place of a user's actual credit/debit card number(s), the central Web site is able to complete its services by registering the user at Web sites that require credit/debit card information, without sacrificing the security of the user's true personal financial credit/debit card information.

The central Web site typically will not retain users' actual credit/debit card account information necessary to register users at Web sites that require such information in order to log in and use their services (e.g., e-commerce and online auction sites). The central Web site will, however, typically create links with the users' names and passwords that such users have already created at these types of sites. The central Web site typically chooses not to hold users' actual credit/debit card number information as part of a service policy, since the central Web site typically cannot guarantee the safety of such information which has been provided to the Web sites users have selected. The online credit/debit card account is created to allow users the power of having the same spending abilities and capabilities online that a credit/debit card provides, without having to sacrifice the security of their personal financial information at the same time.

The central Web site typically will have the exclusive maintenance of (and be the sole proprietor for) the balance information for the users' online credit/debit pre-paid charge card accounts and for screens or windows provided in the users' personal Web pages. Accordingly, since the users' actual personal credit/debit card information is already held at the financial institution(s) which issue the credit/debit cards, there is no need for any other institution to have that data, especially Web sites. With the online credit/debit card account system according to the present invention, no one (other than a user and the user's own bank or financial institution) will know the user's actual credit/debit card information.

The online credit/debit card account number typically can only be used for online purchases at Web sites and at credit/debit card service Web sites and typically will have no other real-world application. This feature will prevent the use of these new online credit/debit card account numbers in major types of fraud, such as mail order catalog fraud and credit/debit card fraud. The central Web site will also encourage users to only apply to the online credit/debit pre-paid charge card account as much money as they are going to spend at each online e-commerce destination. This feature will greatly minimize the amount of money exposed to risk during online e-commerce transactions. In addition, should the online credit/debit or pre-paid charge card account numbers ever get stolen, the thief typically would never know exactly when there would be money in the online credit/debit card account to spend or when the online credit/debit or pre-paid charge card account will be active to accept charges.

There are very positive public relations benefits to supporting the online credit/debit card account system according to the present invention that will enable a user to be secure while spending money online. Minimal development time is needed to launch the online credit/debit card account system according to the present invention because the service will be connected an existing architecture that has already been developed by the financial institutions which will support the online credit/debit card account system. In addition, the online credit/debit card account system according to the present invention will function with existing technology which e-commerce Web sites use to process credit/debit card transactions online.

The "parsing" of various data and files (e.g., update files 410, 414 and 608, destination Web site registration forms, etc.) in the credit/debit card account system according to the present invention is further described as follows. For example, the form management system (FMS), running on a computer, establishes a TCP/IP connection with a destination Web site, running on a second computer. The FMS makes an HTTP request to the destination Web site and receives an HTML page back from the destination Web site as a text string. This text string that is the HTML page is then parsed. The parsing code automatically extracts HTML form specific tags from the text string by applying, for example, rule-based methods as per the WWW HTML standard. The parsing code then stores the form tag data into a collection of data known as an array. The data in this array is then entered into the database 122 by database specific code that applies rule based methods to ensure that data is stored in the proper database table.

Parsing is a methodology in which a program iterates through text, character by character, to extract certain text strings (words), as specified by programmed rules. The central Web site's HTML parser is kept up to date, so that the rules consistently adhere to the W3 consortium HTML standard as it continues to evolve. That is, as new tags are added or tags are modified, the rules of the Web site's parser are updated to reflect such changes.

For example, given a page string:

```
"<html>
<head>
<title>NY Times on the Web</title>
</head>
<body>
<form action=/cgi-bin/program.cgi name=register>
.....
<input type=textfield size=20 maxlength=50 name=username>
.....
</form>
</body>
</html>"
``` by parsing the textfield "<input type=textfield size=20 maxlength=50 name=username>" is extracted. This textfield is now parsed for "type", "size", "maxlength", "value" and if the field is not found in the tag it is entered as null. In this case value null. So in this way the central Web site has form data to enter. In other words, the central Web site has obtained a form URL, which is required to get the corresponding HTML data from a Web site.

The central Web site has parses the "action" field of the form. In this case, action="/cgi-bin/program.cgi". Accordingly, the central Web site now has unique identifiers for all forms by using the form URL-form name-form-action relationship. Forms are given a unique form identification number (e.g., 33) based on this tri-party relationship. Then all form elements are stored in the database 122. For each kind of element, there is a corresponding database table. Accordingly, for the above textfield, the central Web site inserts this data into the corresponding textfield table of the database 122 with a SQL statement, such as "INSERT INTO TEXTFIELDS (NAME, SIZE, MAXLENGTH, VALUE, FORM_ID, SPECIAL) VALUES ('username', 20, 50, NULL, 33, 'login')". In this example, "Special" is the central Web site's corresponding field identifier, which is selected from a list of possible values. In this case, a "username" would represent a login name, so "login" would be associated with this form element.

Targeted Advertising Based on User Information

In another embodiment, the central Web site may also use a targeted advertising strategy to deliver relevant advertisements to its users and will typically only employ the information provided to the central Web site in the membership form templates to target such advertisements. For example, if an advertising client (e.g., Barnes & Noble) of the central Web site would like all of the central Web site's male users over the age of 50 to view an advertisement (e.g., for books), the central Web site can deliver such a targeted advertisement based on the user information (e.g., contained in the database 122) fitting such targeting criteria. In such a situation, the central Web site creates a database (e.g., in the database 122) of uses' identification numbers based on the users' demographic information, as it was provided to the central Web site during the users' initial registration. Accordingly, users' demographics, such as gender, region, age, time zone, etc., can be collected and can be employed to attract advertisers. The central Web site will then use the created database to change the advertisements according to these traits and targeting criteria. In order to assure the privacy of the central Web site's users, the central Web site, through its privacy policy, will guarantee not to track the destinations of its users to target advertising.

As a result, the central Web site according to the present invention provides an online/offline service that: (i) eliminates the need for users to re-enter the same personal information at every new site that the user wants to be registered at, (ii) alleviates users from needing to re-type the same recurring user names and passwords to get through the gateways of most Web sites and e-mail accounts, (iii) delivers a targeted advertisement system to send relevant advertisements to its users based on demographics, but typically not based on Web site visiting habits (i.e., Web surfing habits) of the users and (iv) resolves users' concerns over the security of their credit/debit card numbers on the Internet, while still delivering the ability to shop, bid at auctions, make charitable donations and pledges and otherwise use credit/debit card service Web sites.

The central Web site may be implemented as a multi-language international Web site with local/global domains for each language. The services provided by the central Web site are most useful to new Internet users who have yet to encounter the usual delays and problems previously described. There are far more people outside the United States who still have not ventured onto the Internet. The ease and efficiency of the central Web site according to the present invention will help induce more people to begin to use the Internet.

The central Web site may also include a restricted version of the site's services to be advantageously used in school systems. This restricted "educational" version allows the students to navigate only to those destinations on the Web that school officials pre-approve, such as research sites, educational sites and other such destinations.

The central Web site also may include a calendar with programmable reminders for events and special occasions and the central Web site could include an advertisement on such reminders, which can be sold to e-commerce sites to suggest gift ideas.

The central Web site also may include a browser plug-in for providing the central Web site's services previously described, as will be appreciated by those skilled in the relevant art(s). In this way, a user of the central Web site could use such a plug-in to send the URL that the user is viewing to the central Web site as a request for the central Web site to generate a link for the URL in a personal Web page with a click of a button.

The central Web site could also be developed as a platform for the central Web site's software to allow the users' account information to be accessible on wireless devices, such as PDAs, cellular phones, etc., to support a wireless Web, as will be appreciated by those skilled in the relevant art(s).

Figure 25:
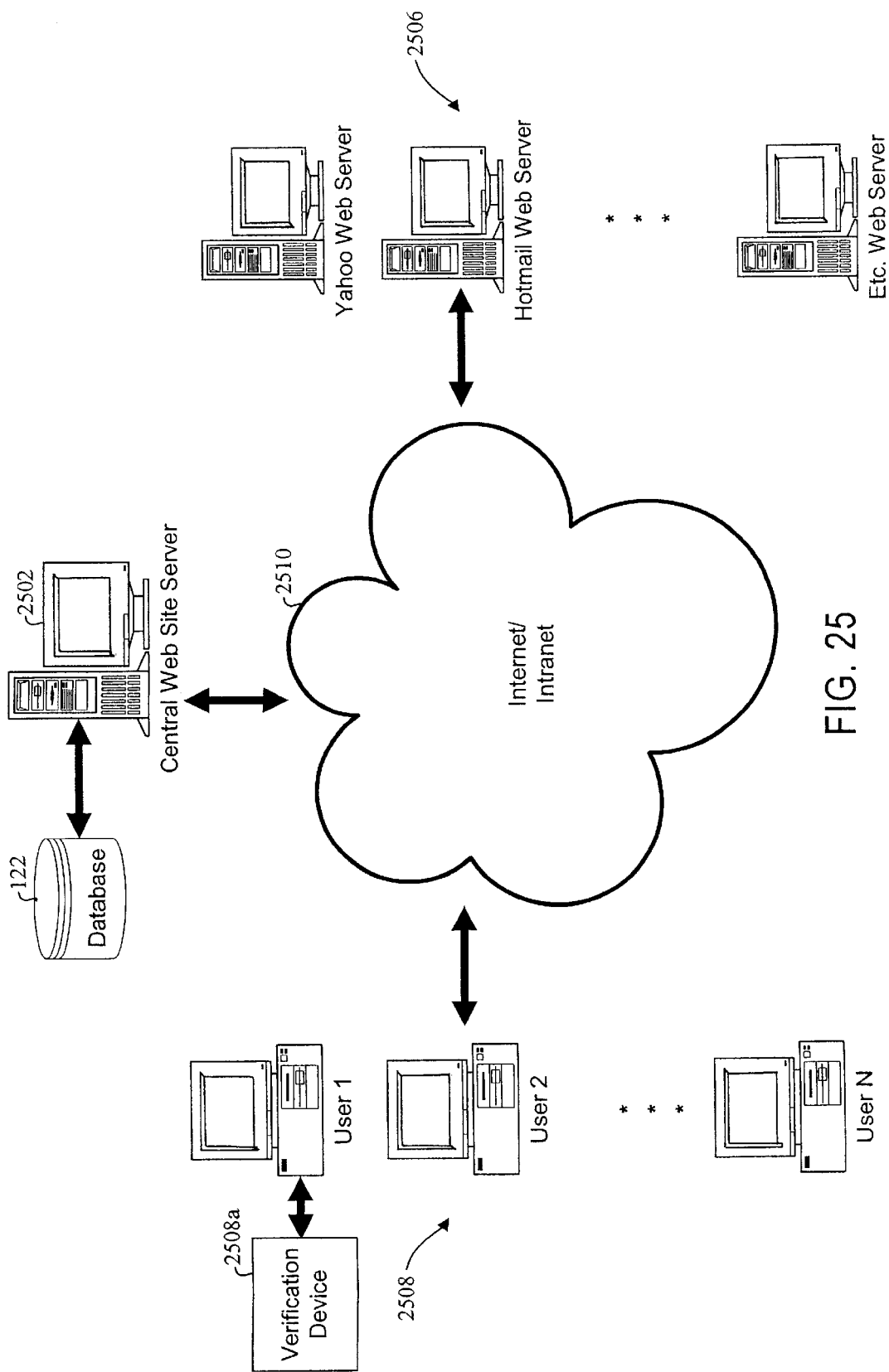
FIG. 25 is a top level system block diagram for implementing the systems and processes of FIGS. 1–3, according to the present invention.

FIG. 25 is a top level system block diagram for implementing the systems and processes of FIGS. 1–3, according to the present invention. In FIG. 25, the central Web site's server 2502 is coupled to a database 122, which may be hosted on server 2502 or another computer (e.g., for security purposes). The users via computers 2508 and an optional verification device 2508a can access the central Web site server 2502 via the Internet or Intranet 2510. Once a user, via the computers 2508, is logged into the central Web site's server 2502, the above described processes with respect to FIGS. 1–3 can be used to communicate information to servers 2506 of other Web sites, as previously described.

Figure 26:
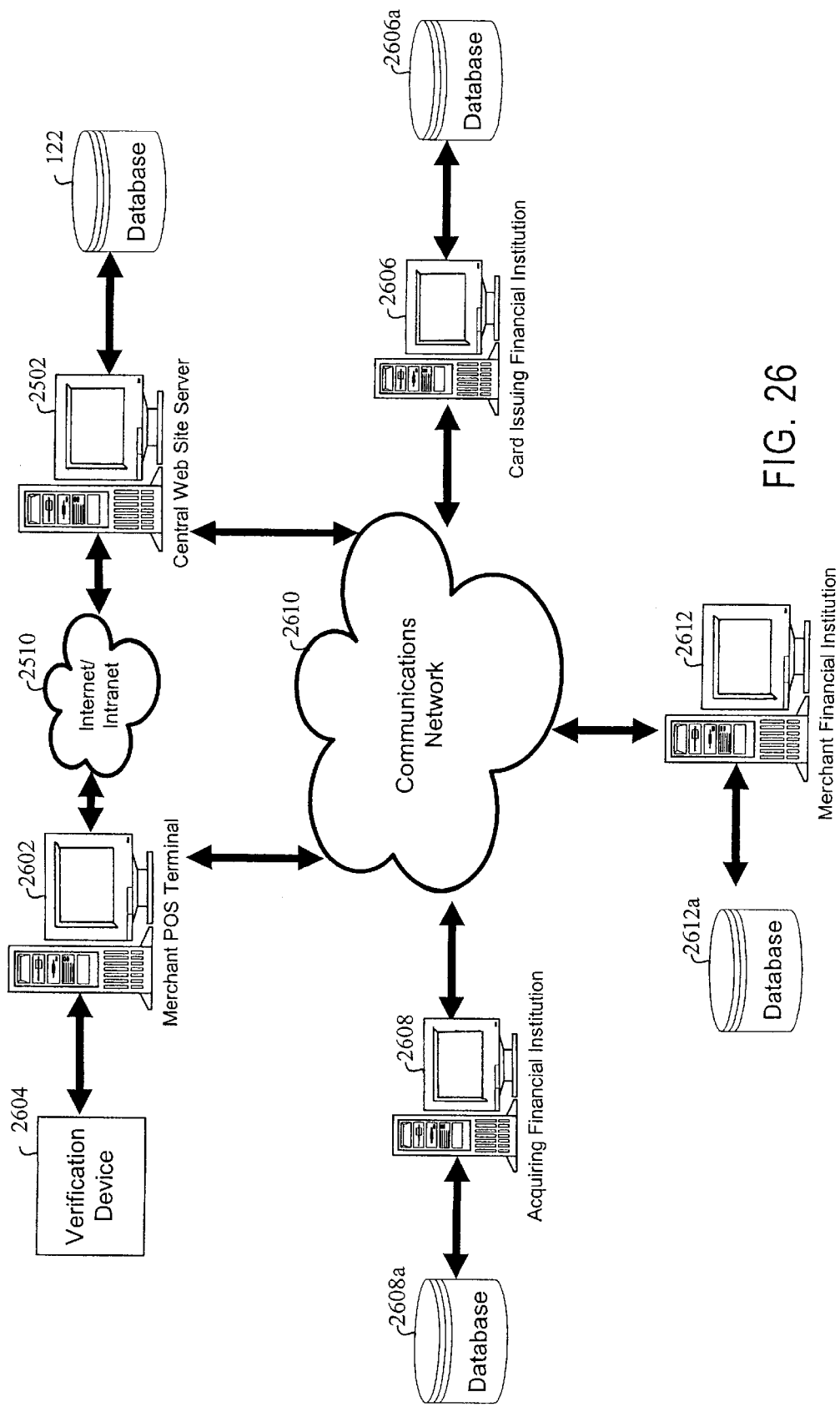
FIG. 26 is a top level system block diagram for implementing the systems and processes of FIGS. 4–24, according to the present invention.

FIG. 26 is a top level system block diagram for implementing the systems and processes of FIGS. 4–24, according to the present invention. In FIG. 26, a verification device 2604 is coupled to a retail store point-of sale terminal or Web site 2602 and can be used to implement the user identification/authorization and biometric processes previously described. The retail store or Web site 2602 is coupled to the central Web site 2502 via the Internet or an Intranet 2510. The central Web site 2502 includes the database 122 for storing user account information, destination Web site form information, etc. The retail store or Web site 2602 and the central Web site 2502 are coupled to communication network 2610, which is used for processing online and offline credit/debit card transactions. The network 2610 may be the same network as the network 2510. Also coupled to the network 2610, are one or more acquiring financial institutions 2608, card issuing financial institutions 2606 and merchant (e.g., online or offline retailers) financial institutions 2612, including respective databases 2608a, 2606a and 2612a thereof. Accordingly, the processes as described with respect to FIGS. 4–24 can be implemented via the system of FIG. 26.

Figure 27:
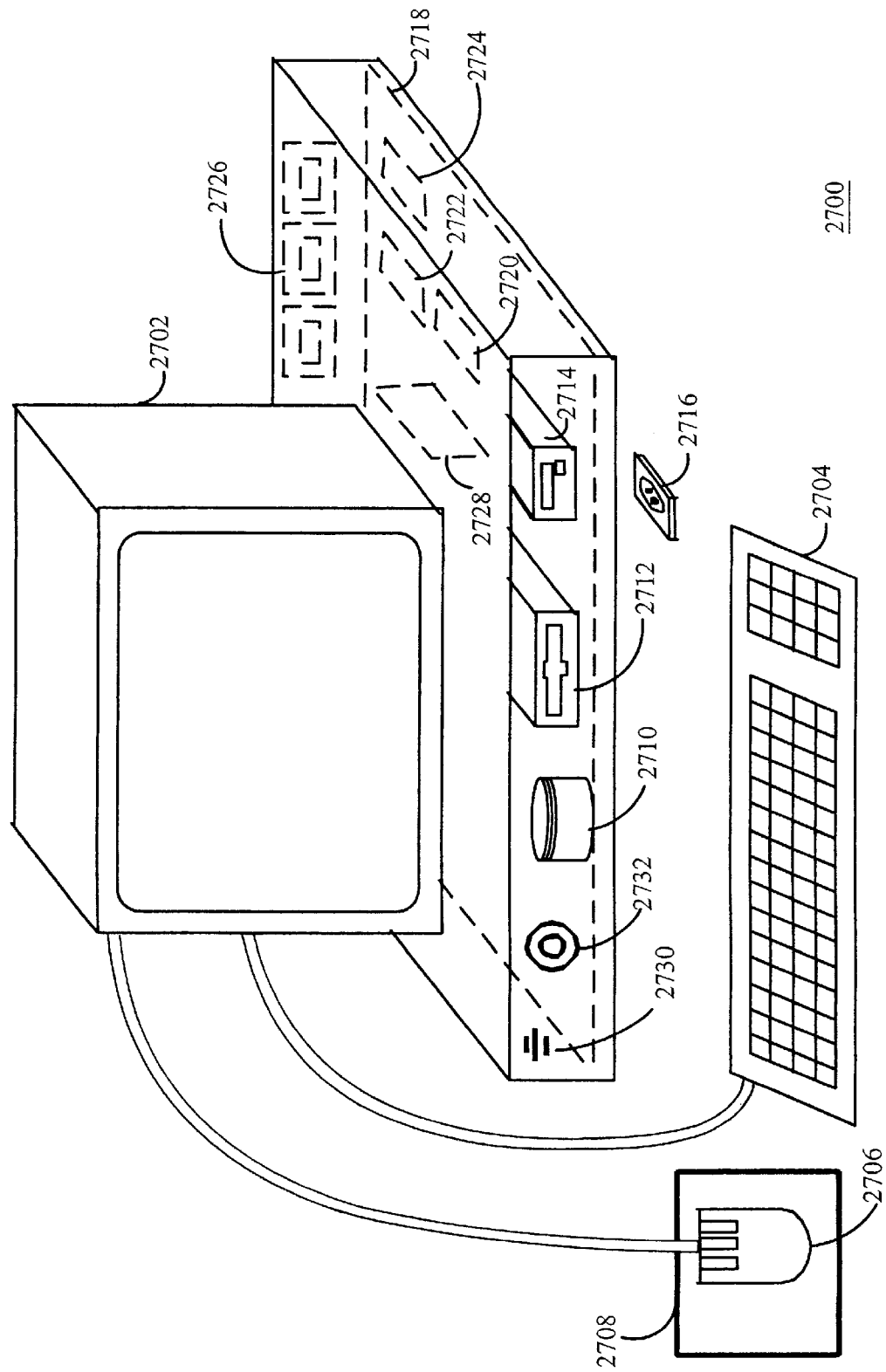
FIG. 27 is a diagram illustrating a general purpose computer that can be programmed according to the teachings of the present invention.

FIG. 27 is a schematic illustration of a general purpose computer 2700 (e.g., corresponding to the server 2502, the servers 2506, the users' computers 2508, etc.) that can be programmed according to the teachings of the present invention. In FIG. 27, the computer 2700 implements the processes of the present invention, wherein the computer includes, for example, a display device 2702 (e.g., a touch screen monitor with a touch-screen interface, etc.), a keyboard 2704, a pointing device 2706, a mouse pad or digitizing pad 2708, a hard disk 2710 or other fixed, high density media drives, connected using an appropriate device bus (e.g., a SCSI bus, an Enhanced IDE bus, an Ultra DMA bus, a PCI bus, etc.), a floppy drive 2712, a tape or CD ROM drive 2714 with tape or CD media 2716 or other removable media devices, such as magneto-optical media, etc. and a mother board 2718. The mother board 2718 includes, for example, a processor 2720, a RAM 2722 and a ROM 2724 (e.g., DRAM, ROM, EPROM, EEPROM, SRAM, SDRAM and Flash RAM, etc.), I/O ports 2726 which may be used to couple to peripheral devices and optional special purpose logic devices (e.g., ASICs, etc.) or configurable logic devices (e.g., GAL and re-programmable FPGA) 2728 for performing specialized hardware/software functions, such as sound processing, image processing, signal processing, speech recognition processing, neural network processing, fingerprint recognition processing, retinal recognition processing, automated classification, modem/DSL/ADSL/ISDN communications processing, Web site server processing, Internet communication processing, etc., a microphone 2730 and a speaker or speakers 2732.

As stated above, the system includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 2700 and for enabling the computer 2700 to interact with a human user. Such software may include, but is not limited to, device drivers, operating systems and user applications, such as development tools. Such computer readable media may also include the computer program product of the present invention for performing any of the processes according to the present invention, as previously described. The computer code devices of the present invention can be any interpreted or executable code mechanism, including but not limited to scripts, interpreters, dynamic link libraries, Java classes, complete executable programs, etc.

Accordingly, the mechanisms and processes set forth in the present invention may be implemented using a conventional general purpose microprocessor or computer programmed according to the teachings in the present invention, as will be appreciated by those skilled in the relevant art(s). Appropriate software coding can readily be prepared by skilled programmers based on the teachings of the present invention, as will also be apparent to those skilled in the relevant art(s). However, as will be readily apparent to those skilled in the relevant art(s), the present invention also may be implemented by the preparation of application-specific integrated circuits or by interconnecting an appropriate network of conventional component circuits.

The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards or any type of media suitable for storing electronic instructions.

Although the present invention is described in terms of practicing the method over the Internet or an Intranet, the present invention can be implemented for other means of communication, such as wireless, satellite, etc. communication, as will be appreciated by those skilled in the relevant art(s).

Although the present invention is described in terms of processing Web site registration forms, the present invention can be implemented for processing all types of Web site forms, as will be appreciated by those skilled in the relevant art(s).

Although the present invention is described in terms of the central Web site transmitting the update files 410/414/608, the present invention can be implemented with the destination Web site 418 transmitting the update files 410/414/608 and/or with the financial institutions/credit/debit card networks performing the credit/debit card activation processes, as will be appreciated by those skilled in the relevant art(s).

Although the present invention is described in terms of the central Web site transmitting the update files 410/414/608, the present invention can be implemented with the destination Web site 418 transmitting update signals including the transaction information contained in the update files 410/414/608, as will be appreciated by those skilled in the relevant art(s).

Although the present invention is described in terms of the central Web site using a predetermined amount of time (e.g., 15–30 minutes) for deactivation of an online transaction, the present invention can be implemented using other predetermined amounts of time (e.g., 1 hour, 1 day, 1 week, etc.), as will be appreciated by those skilled in the relevant art(s).

Although the present invention is described in terms of the update file verification device 602 being located between the servlet 218 and the credit/debit card issuing bank/financial institution 412, the device 602 may be located in other areas of the system, such as between the credit/debit card network 508 and the underwriting financial institution 606, between the credit/debit card issuing bank/financial institution 412 and the underwriting financial institution 606, etc., as will be appreciated by those skilled in the relevant art(s).

Although the present invention is described in terms of providing for a user an online/offline credit/debit card secure transaction service, the present invention may include a preliminary online/offline credit/debit card issuance/approval service, as will be appreciated by those skilled in the relevant art(s).

Although the present invention is described in terms of providing for a user an online/offline credit/debit card secure transaction service, the present invention may include a preliminary activation feature for the online/offline credit/debit card account via an activation code input by the user and matched against a corresponding activation code stored at the central Web site, as will be appreciated by those skilled in the relevant art(s).

Although the present invention is described in terms of using servlets (e.g., implemented using Java programming language), other applications and programming languages may be used, such as CORBA objects, Active X applications, PEARL scripts, etc., as will be appreciated by those skilled in the relevant art(s).

Although the present invention is described in terms of using HTML, other Internet programming languages may be used, such as XML, EXML, etc., as will be appreciated by those skilled in the relevant art(s).

Although the present invention is described in terms of a user logging into the central Web site using a personal computer, other devices, such as personal data assistants (PDAs), Internet-ready cellular phones, using the TCP/IP, WAP, 3G, protocols, etc., can be used to log into the central Web site, as will be appreciated by those skilled in the relevant art(s).

Although the present invention is described in terms of activating the online credit/debit card during e-commerce transactions from a central Web site location, the present invention can be implemented with the central Web site acting as an e-commerce Web site, wherein the online credit/debit card is activated by the central Web site acting as an e-commerce Web site when a user visits the e-commerce Web site and is de-activated at the conclusion of the user's checkout process, as will be appreciated by those skilled in the relevant art(s).

Although the present invention is described in terms of activating the online credit/debit card during e-commerce transactions from a central Web site location, the present invention can be implemented with the central Web site acting as an Internet Service Provider (ISP) Web site, wherein the online credit/debit card is activated by the central Web site acting as an ISP Web site, when a user logs in or when a user visits an e-commerce Web site and is de-activated at log out or after a time out, as will be appreciated by those skilled in the relevant art(s).

Although the present invention is described in terms of activating the online credit/debit card during e-commerce transactions from a central Web site location, the present invention can be implemented with the central Web site acting as an auction Web site, wherein the online credit/debit card is activated by the central Web site acting as an auction Web site, when a user's bid is accepted and is de-activated after the bid charge is processed, as will be appreciated by those skilled in the relevant art(s).

Although the present invention is described in terms of activating the online credit/debit card during e-commerce transactions from a central Web site location, the present invention can be implemented with the central Web site acting as a "name your own price" Web site, wherein the online credit/debit card is activated by the central Web site acting as a "name your own price" Web site, when a user's bid is accepted and is de-activated after the bid/order is processed, as will be appreciated by those skilled in the relevant art(s).

Although the present invention is described in terms of activating the online credit/debit card during e-commerce transactions from a central Web site location, the present invention can be implemented with the central Web site acting as a travel agency Web site, wherein the online credit/debit card is activated by the central Web site acting as a travel agency Web site, when a user's order is accepted and is de-activated after the order is processed, as will be appreciated by those skilled in the relevant art(s).

Although the present invention is described in terms of activating the online credit/debit card during e-commerce transactions from a central Web site location, the present invention can be implemented with the central Web site acting as an online delivery Web site, wherein the online credit/debit card is activated by the central Web site acting as an online delivery Web site, when a user's order is accepted and is de-activated after the order is processed, as will be appreciated by those skilled in the relevant art(s).

Although the present invention is described in terms of activating the online credit/debit card during e-commerce transactions from a central Web site location, the present invention can be implemented with the central Web site acting as an online bookmark Web site, wherein the online credit/debit card is activated by the central Web site acting as an online bookmark Web site, when a user visits a book marked e-commerce Web site and is de-activated after a predetermined time-out period, as will be appreciated by those skilled in the relevant art(s).

Although the present invention is described in terms of activating the online credit/debit card during e-commerce transactions from a central Web site location, the present invention can be implemented with the central Web site acting as an online bank/financial institution Web site (or traditional bank site), wherein the online credit/debit card is activated and de-activated by an e-commerce site, which notifies the central Web site acting as an online bank/financial institution Web site (or traditional bank site) of the activation and de-activation, as will be appreciated by those skilled in the relevant art(s).

Although the present invention is described in terms of activating the online credit/debit card during e-commerce transactions from a central Web site location, the present invention can be implemented with the central Web site acting as an online bill payment Web site, wherein the online credit/debit card is activated by the central Web site acting as an online bill payment Web site, when a user's order to pay a bill is accepted and is de-activated after the transaction is processed, as will be appreciated by those skilled in the relevant art(s).

Although the present invention is described in terms of activating the online credit/debit card during e-commerce transactions from a central Web site location, the present invention can be implemented with the central Web site acting as an online monetary system Web site, wherein the online credit/debit card is activated by the central Web site acting as an online monetary system Web site, when a user wants to purchase online money for shopping at participating retailers and is de-activated after the transaction is processed, as will be appreciated by those skilled in the relevant art(s).

Although the present invention is described in terms of activating the online credit/debit card during e-commerce transactions, the present invention can be implemented for offline transaction by only activating a "real-world" credit/debit card while in use by a consumer, for example, using a personal identification number entered at credit/debit card readers in "real-world" merchant shops to temporarily activate the credit/debit card during the offline transaction, as will be appreciated by those skilled in the relevant art(s).

Numerous modifications and variations of the present invention are possible in light of the above teachings. It is therefore to be understood that within the scope of the appended claims, the invention may be practiced otherwise than as specifically described herein.

GLOSSARY

In the context of the present invention:

"acquiring bank" or "merchant bank" refers to a bank that has a business relationship with a merchant and receives all credit/debit card transactions from that merchant.

"authorization" refers to approval of a credit/debit card transaction for a merchant by a card-issuing bank.

"asymmetric encryption" refers to a cryptographic system that uses two keys—a public key known to everyone and a private or secret key known only to the recipient of the message. When John wants to send a secure message to Jane, he uses Jane's public key to encrypt the message. Jane then employs her private key to decrypt it. An important element to the public key system is that the public and private keys are related in such a way that only the public key can be used to encrypt messages and only the corresponding private key can be used the decrypt them. Morever, it is virtually impossible to deduce the private key if one only knows the public key.

"authorization code" refers to a code assigned by a card issuing bank to a credit/debit card sale to show that the transaction is authorized.

"bank card" refers to a credit/debit card issued by a bank (e.g., Visa and MasterCard are bank cards and American Express and Discover are not).

"browser" refers to a program that accesses and displays files available on the World Wide Web.

"chargeback" refers to a credit/debit card transaction that is billed back to a merchant who made the sale.

"client" refers to a computer or program that can download files for manipulation from a server.

"cookie" refers to information that a Web site puts on a user's hard disk so that the Web site can remember something about the user at a later time (more technically, a cookie is information for future use that is stored by the server on the client side of a client/server communication.

"cryptography" refers to the art of protecting information by transforming it (encrypting it) into an unreadable format, called cipher text. Only those who possess a secret key can decipher (or decrypt) the message into plain text. Encrypted messages can sometimes be broken by cryptanalysis, also called codebreaking, although modem cryptography techniques are virtually unbreakable.

"e-commerce" (also referred to as "electronic commerce" or "EC" ) refers to the buying and/or selling of goods and/or services on the Internet, especially the World Wide Web.

"URL" refers to a statement that specifies a transmission protocol and an Internet identifying number, used chiefly for moving from site to site on the World Wide Web.

"electronic data capture" refers to entering and processing sales drafts by electronic means (in online payment schemes, capture is used to denote the electronic deposit of the sales draft with the acquiring bank).

"e-mail" refers to messages sent and received electronically via telecommunication links, as between microcomputers or terminals.

"encryption" refers to the translation of data into a secret code. Encryption is the most effective way to achieve data security. To read an encrypted file, you must have access to a secret key or password that enables you to decrypt it. Unencrypted data is called plain text; encrypted data is referred to as cipher text. There two main types of encryption: asymmetric encryption and symmetric encryption.

"hardware" refers to a computer and the associated physical equipment directly involved in the performance of data-processing or communications functions.

"home page" refers to the file available for access at a World Wide Web site intended chiefly to greet visitors, provide information about the Web site and direct them to other Web sites with more related information.

"HTML" (Hypertext Markup Language) is the set of "markup" symbols or codes inserted in a file intended for display on a World Wide Web browser. HTML is the authoring language used to create documents on the World Wide Web. HTML is similar to SGML, although it is not a strict subset. HTML defines the structure and layout of a Web document by using a variety of tags and attributes.

"HTML forms" refers to a formatted HTML document containing fields that users can fill in with data. The forms appears on the user's display screen and the user fills it in by selecting options with a pointing device or typing in text from the computer keyboard. The HTML language has built-in codes for displaying form elements such as text fields and check boxes. Typically the data entered into a web-based form is processed by a common gateway interface (CGI) program.

"HTTP" (HyperText Transfer Protocol) refers to the underlying protocol used by the World Wide Web. HTTP defines how messages are formatted and transmitted and what actions Web servers and browsers should take in response to various commands. For example, when a user enters a URL in the user's browser, this actually sends an HTTP command to the Web server directing it to find and transmit the requested Web pages.

"hypertext" refers to a computer-based text retrieval system that enables the user to provide access to or gain information related to a particular text; a "link" "hyperlink" or "hypertext link" refers to a selectable connection from one word, picture or information object to another.

"independent sales organization" (ISO) refers to organizations that act as a third party between the merchant and the acquiring bank (e.g., if a business is unable to obtain merchant status through an acquiring bank because the bank views them as too large a risk they may need to go through an ISO to obtain merchant status).

"interchange" refers to a transaction that takes place between the acquiring bank and a credit/debit card-issuing bank.

"interchange fee" refers to a fee an acquiring bank pays to a credit/debit card-issuing bank in order to process a credit/debit card transaction involving a card holder's account.

"Internet" refers to a matrix of computer networks that connects computers around the world.

"Intranet" refers to a network of computers or a network of computer networks that is contained within an enterprise.

"login name" refers to an identification string, distinct from a password, that is required for logging on to a multi-user system, bulletin board system, local area network (LAN) or online service and is also referred to as a "user name" or "User ID".

"logon" or "login" refers to the procedure used to get access to an operating system or application and requires that the user have a user ID and a password.

"merchant discount" refers to a percentage of a retail sale a merchant pays as a fee to an acquiring bank for processing a credit/debit card transaction.

"merchant status" refers to a business having authorization from an acquiring bank, ISO or other financial institution to accept credit/debit cards.

"modem" refers to a device or program that enables a computer to transmit data over telephone lines. Computer information is stored digitally, whereas information transmitted over telephone lines is transmitted in the form of analog waves. A modem converts between these two forms.

"online" refers to being connected to or being accessible by means of a computer or computer network.

"parse" or "parsing" refers to breaking a string of characters into groups of smaller strings using a specific set of rules.

"password" refers to a sequence of characters required to gain access to a computer system.

"personal Web page" refers to the file available for access at a World Wide Web site intended chiefly to greet a specific user, provide personalized information to the user and/or direct the user to user specified Web sites.

"plug-in" refers to programs that can easily be installed and used as part of a user's Web browser.

"program" refers to a procedure for solving a problem that involves collection of data, processing and presentation of results with such a procedure coded for a computer or an instruction sequence in programmed instruction.

"sales draft" refers to an instrument showing an obligation on a cardholder's part to pay money, (i.e. the sale amount), to a card issuer(e.g., this is the piece of paper signed when making a purchase with a credit/debit card. Sales draft data can be "captured" electronically and sent to be processed over financial networks.

"screen" or "window" refers to data or file(s) presented to a user via a Web browser.

"secure" refers to data that is encoded using encryption or other means so as to ensure the integrity of the data.

"server" refers to a computer or program that controls a central repository of data that can be downloaded and manipulated in some manner by a client.

"servlet" refers to a small program that runs on a server.

"session object" refers to a series of related interactions between a single user and the web server which takes place over a series of time. This session could be a series of transactions or requests. The session may consist of multiple requests to the same servlet or of requests to a variety of different resources on the same web site.

"S-HTTP" refers to an extension of the HTTP to support sending data securely over the World Wide Web. Not all web browsers and servers support S-HTTP.

"software" refers to programs, routines and symbolic languages that control the functioning of the hardware and direct its operation.

"SSL" (Secure Sockets Layer) refers to a technology for transmitting secure communications over the World Wide Web. SSL is a protocol developed by Netscape for transmitting private documents via the Internet. SSL works by providing a private key to encrypt data that's transferred over the SSL connection. Both Netscape Navigator and Internet Explorer support SSL and many Web sites use the protocol to obtain confidential user information, such as credit/debit card numbers. Buy convention, Web pages that require an SSL connection start with https: instead of http.

"SQL" (Structured Query Language) refers to a standard interactive and programming language for getting information from and updating a database.

"start page" refers to a file available for access at a World Wide Web site intended for a unique user after the user has logged in/on the Web site.

"symmetric encryption" refers to a type of encryption where with same key is used to encrypt and decrypt the message.

"virtual", in general, means the quality of effecting something without actually being that something.

"Web site" refers to a collection of Web files on a particular subject that includes a beginning file called a home page.

"World Wide Web" refers to an information server on the Internet composed of interconnected sites and files, accessible with a browser.

What is claimed as new and desired to be secured by Letters Patent of the United States is:

1. A method for managing a user online financial transaction at a destination e-commerce web site, comprising:

logging in the user to a destination e-commerce web site;

transmitting an activation command to a financial institution processing financial transactions for activating a reusable, pre-existing, unaltered and permanent credit or debit card account number of the user while the user is logged into the destination e-commerce web site;

submitting a charge request including the reusable, pre-existing, unaltered and permanent credit or debit card account number to the financial institution via the destination e-commerce web site while the reusable, pre-existing, unaltered and permanent credit or debit card account number is in the activated status; and transmitting a de-activation command to the financial institution for de-activating the reusable, pre-existing, unaltered and permanent credit or debit card account number, wherein the financial institution only accepts and processes charge requests received from e-commerce web sites while the reusable, pre-existing, unaltered and permanent credit or debit card account number is in the activated status and wherein the financial institution declines charge requests while the reusable, pre-existing, unaltered and permanent credit or debit card account number is in the de-activated status.

2. The method according to claim 1, wherein the online financial transaction is performed from a central web site.

3. The method according to claim 2, wherein the activation command is automatically transmitted to the financial institution when the user logs from the central web site into a destination e-commerce web site.

4. The method according to claim 2, wherein the result of the processing of the online financial transaction is transmitted to the user via the central web site.

5. The method according to claim 2, wherein the activation command is transmitted from the central web site.

6. The method according to claim 2, wherein the de-activation command is transmitted from the central web site.

7. The method of claim 2, further comprising:

authenticating a user at a central web site; and transmitting from the central web site said activation signal to a financial transaction processor for processing of charge requests, wherein the financial transaction processor processes charge requests received form commerce sites while the reusable, pre-existing, unaltered and permanent credit or debit card account number is activated and declines charge requests while the reusable, pre-existing, unaltered and permanent credit or debit card account number is in de-activated.

8. The method according to claim 7, wherein the commerce sites include online commerce sites and an offline commerce sites, and the charge requests include online charge requests and an offline charge requests.

9. The method according to claim 7, wherein the user authentication includes at least one of authentication of the user based on a user name and password of the user and authentication of the user based on biometric information of the user.

10. The method according to claim 7, wherein the de-activating of the reusable, pre-existing, unaltered and permanent credit or debit card account number is performed at the financial transaction processor alter the processing of charge requests without the de-activation command being received.

11. The method according to claim 2, comprising presenting the user with the destination e-commerce web site the from the central web site.

12. The method according to claim 1, wherein the user is automatically logged into the destination e-commerce web site.

13. The method according to claim 12, further comprising:

parsing a form web page of the destination e-commerce web site to extract form data fields therefrom;

mapping form data fields of a central web site form to corresponding extracted form data fields of the form web page of the destination e-commerce web site; and using the mapped farm data fields to perform logging in the user at the destination e-commerce web site.

14. The method according to claim 13, wherein the form web page of the destination e-commerce web site comprises a login form web page for the destination e-commerce web site, and the method further comprises:

gathering user information data elements corresponding to form data fields of the central web site from the user;

populating the form data fields of the login form web page of the destination e-commerce web site with corresponding user information data elements based on the data fields of the central web site form mapped to the extracted form data fields of the login form web page of the destination e-commerce web site; and transmitting the populated login form web page to the destination e-commerce web site to login the user at the destination web site.

15. The method according to claim 13, wherein the form web page of the destination e-commerce web site comprises an online financial transaction form web page for the destination e-commerce web site, and the method further comprises:

gathering user information data elements corresponding to form data fields of the central web site from the user;

populating the form data fields of the online financial transaction form web page of the destination e-commerce web site with corresponding user information data elements based on the data fields of the central web site form mapped to the extracted form data fields of the online financial transaction form web page of the destination e-commerce web site; and transmitting me populated online financial transaction form web page to the destination e-commerce web site to execute an online financial transaction for the user at the destination e-commerce web site.

16. The according to claim 13, wherein the form web page of the destination e-commerce web site comprises a registration form web page for the destination e-commerce web site, and the method further comprises:

gathering user information data elements corresponding to form data fields of the central web site from the user;

populating the form data fields of the registration form web page of the destination e-commerce web site with corresponding user information data elements based on the data fields of the central web site form mapped to the extracted form data fields of the registration form web page of the destination e-commerce web site; and transmitting the populated registration form web page to the destination e-commerce web site to register the user at the destination e-commerce web site.

17. The method according to claim 1, wherein the activation command is transmitted from the destination e-commerce web site.

18. The method according to claim 1, wherein the de-activation command is transmitted from the destination e-commerce web site.

19. The method according to claim 1, further comprising:

creating a unique user name and password for the user at the central web site; and using the unique user name and password to register the user at one or more other destination e-commerce web sites.

20. The method according to claim 1, wherein the de-activation command to the financial institution is transmitted (i) a predetermined amount of time after the user went online to perform the online financial transaction or (ii) after the user went offline.

21. The method according to claim 1, wherein the activation or de-activation commands are transmitted as one of an activation signal, an encrypted e-mail message, a secure facsimile message, a secure wireless communication message, and a secure telephone communication message.

22. The method according to claim 1, further comprising:

creating a unique online credit or debit card with a limited available balance based on the reusable, pre-existing, unaltered and permanent credit or debit card account number of the user; and allowing the user to execute a financial transaction using the unique online credit or debit card in place of the reusable, pre-existing, unaltered and permanent credit or debit card account number during the online financial transaction.

23. A system configured to perform the steps recited in claim 1.

24. A storage medium storing a computer program for performing the steps recited in claim 1.

25. A system for managing a user online financial transaction at a destination e-commerce web site, comprising:

means for logging in the user to a destination e-commerce web site;

means for transmitting an activation command to a financial institution processing financial transactions for activating a reusable, pre-existing, unaltered and permanent credit or debit card account number of the user while the user is logged into the destination e-commerce web site;

means for submitting a charge request including the reusable, pre-existing, unaltered and permanent credit or debit card account number to the financial institution via the destination e-commerce web site while the reusable, pre-existing, unaltered and permanent credit or debit card account number is in the activated status; and means for transmitting a de-activation command to the financial institution for de-activating the reusable, pre-existing, unaltered and permanent credit or debit card account number, wherein the financial institution only accepts and processes charge requests received from e-commerce web sites while the reusable, pre-existing, unaltered and permanent credit or debit card account number is in the activated status and wherein the financial institution declines charge requests while the reusable, pre-existing, unaltered and permanent credit or debit card account number is in the de-activated status.

26. The system according to claim 25, wherein said means for logging, said means for transmitting said activation command, said means for submitting, and said means for transmitting said de-activation command comprise devices of a computer system.

27. The system according to claim 25, wherein said means for logging, said means for transmitting said activation command, said means for submitting, and said means for transmitting said de-activation command comprise computer readable instructions recorded on a computer readable medium.

28. The method according to claim 1, wherein the de-activating of the reusable, pre-existing, unaltered and permanent credit or debit card account number is performed at the financial institution after the processing of charge requests without the de-activation command being received.

* * * * *